(12) United States Patent
Ohhashi

(10) Patent No.: US 12,475,620 B2
(45) Date of Patent: Nov. 18, 2025

(54) IMAGE PROCESSING DEVICE, METHOD, AND PROGRAM PRODUCT TO COMBINE IMAGES OVERLAPPING 3D OBJECT CLOSEST TO MOVING BODY

(71) Applicant: Socionext Inc., Kanagawa (JP)

(72) Inventor: Kazuyuki Ohhashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 328 days.

(21) Appl. No.: 18/187,129

(22) Filed: Mar. 21, 2023

(65) Prior Publication Data

US 2023/0245362 A1    Aug. 3, 2023

Related U.S. Application Data

(63) Continuation of application No. PCT/JP2020/038389, filed on Oct. 9, 2020.

(51) Int. Cl.
*G06T 11/60* (2006.01)
*G06T 7/13* (2017.01)

(52) U.S. Cl.
CPC .............. *G06T 11/60* (2013.01); *G06T 7/13* (2017.01)

(58) Field of Classification Search
None
See application file for complete search history.

(56) References Cited

U.S. PATENT DOCUMENTS

| | | | | |
|---|---|---|---|---|
| 7,076,116 B2* | 7/2006 | Horie | ....................... | G06T 7/30 382/284 |
| 7,218,758 B2* | 5/2007 | Ishii | ....................... | G01C 11/06 348/E7.086 |
| 8,319,618 B2* | 11/2012 | Gomi | ................... | G06T 15/205 340/435 |
| 8,514,282 B2* | 8/2013 | Imanishi | .............. | G06V 20/588 348/148 |

(Continued)

FOREIGN PATENT DOCUMENTS

| | | |
|---|---|---|
| CN | 103299617 A | 9/2013 |
| CN | 106464847 A | 2/2017 |

(Continued)

OTHER PUBLICATIONS

Gandhi, Tarak, and Mohan M. Trivedi. "Vehicle surround capture: Survey of techniques and a novel omni-video-based approach for dynamic panoramic surround maps." IEEE Transactions on Intelligent Transportation Systems 7.3, pp. 293-308 (Year: 2006).*

(Continued)

*Primary Examiner* — Scott A Rogers
(74) *Attorney, Agent, or Firm* — Rimon P.C.

(57) ABSTRACT

In an aspect, an image processing device includes a hardware processor configured to function as a determination unit and an image generation unit. The determination unit determines a boundary region in a region where spatially adjacent peripheral images of a plurality of peripheral images of a moving body overlap with each other, using position information including a plurality of detection points (Continued)

around the moving body and self-position information of the moving body. The image generation unit generates a combined image, using the spatially adjacent peripheral images, using the boundary region.

11 Claims, 17 Drawing Sheets

(56) References Cited

U.S. PATENT DOCUMENTS

| | | | | |
|---|---|---|---|---|
| 8,576,285 | B2* | 11/2013 | Gomi | B60R 1/27 |
| | | | | 348/148 |
| 10,102,436 | B2* | 10/2018 | Okada | G06V 20/58 |
| 10,262,466 | B2* | 4/2019 | Guo | G06T 3/00 |
| 10,692,173 | B2* | 6/2020 | Scholl | G06V 10/147 |
| 10,848,724 | B2* | 11/2020 | Watanabe | B60R 1/27 |
| 10,970,562 | B2* | 4/2021 | Michiguchi | B25J 9/1679 |
| 11,084,423 | B2* | 8/2021 | Kim | B60W 10/20 |
| 11,302,076 | B2* | 4/2022 | Watanabe | B60R 1/002 |
| 11,634,074 | B2* | 4/2023 | Moriyama | B60R 1/002 |
| | | | | 348/143 |
| 11,787,335 | B2* | 10/2023 | Watanabe | G06T 7/70 |
| | | | | 345/419 |
| 12,045,945 | B2* | 7/2024 | Fujiwara | G06T 15/20 |
| 12,141,936 | B2* | 11/2024 | Ohhashi | G06T 7/70 |
| 2009/0022423 | A1* | 1/2009 | Ehlgen | G06T 11/00 |
| | | | | 382/284 |
| 2009/0097708 | A1 | 4/2009 | Mizuta | |
| 2009/0160940 | A1 | 6/2009 | Imamura | |
| 2012/0121136 | A1 | 5/2012 | Gloger et al. | |
| 2012/0154592 | A1 | 6/2012 | Mizuta | |
| 2014/0375812 | A1 | 12/2014 | Ehlgen et al. | |
| 2017/0096106 | A1 | 4/2017 | Higuchi et al. | |
| 2020/0361378 | A1 | 11/2020 | Omiya et al. | |
| 2020/0404191 | A1 | 12/2020 | Ozaki et al. | |
| 2024/0005795 | A1* | 1/2024 | Jiang | H04N 9/3182 |
| 2024/0098231 | A1* | 3/2024 | Ohhashi | G06T 7/579 |
| 2024/0212269 | A1* | 6/2024 | Taniguchi | G06T 7/50 |
| 2024/0331082 | A1* | 10/2024 | Ohhashi | G06T 3/08 |

FOREIGN PATENT DOCUMENTS

| | | | |
|---|---|---|---|
| JP | 2007-104373 | A | 4/2007 |
| JP | 2007-180720 | A | 7/2007 |
| JP | 2009-100095 | A | 5/2009 |
| JP | 2009-151524 | A | 7/2009 |
| JP | 2009-232310 | A | 10/2009 |
| JP | 2013-501280 | A | 1/2013 |
| JP | 2013-207637 | A | 10/2013 |
| JP | 2014-127839 | A | 11/2014 |
| JP | 2014-531078 | A | 11/2014 |
| JP | 2019-140518 | A | 8/2019 |
| JP | 2019-153138 | A | 9/2019 |

OTHER PUBLICATIONS

Gao, Yi, et al. "3-D surround view for advanced driver assistance systems." IEEE Transactions on Intelligent Transportation Systems 19.1, pp. 320-328 (Year: 2017).*
Written Opinion of the International Searching Authority dated Dec. 8, 2020 issued in International Patent Application No. PCT/JP2020/038389, with English translation.
International Search Report (ISR) issued on Dec. 8, 2020 in International (PCT) Application No. PCT/JP2020/038389, with English translation.
"Environmental Recognition of Mobile Robot: Mapping and Localization System/Control/Information", (Journal of Institute of Systems, Control and Information Engineers), vol. 60, No. 12, pp. 509-514, 2016, with English translation of the relevant passages.
"Environmental Recognition of Mobile Robot: Mapping and Localization System/Control/Information", (Journal of Institute of Systems, Control and Information Engineers), Vol. 50, No. 12, pp. 509-514, 2016, with English translation of the relevant passages.
Office Action dated Aug. 7, 2025 in the corresponding Chinese patent application No. 202080105930.7, w/ English Translation.
Fu Jundong and Yao Xiaoming, "Real-scene Image Stitching and Roaming Control Technology Therefor", Southwest Jiaotong University Press, First edition, Jun. 30, 2011, http://press.swjtu.edu.cn.

* cited by examiner

IMAGE PROCESSING DEVICE, METHOD, AND PROGRAM PRODUCT TO COMBINE IMAGES OVERLAPPING 3D OBJECT CLOSEST TO MOVING BODY

CROSS-REFERENCE TO RELATED APPLICATIONS

This application is a continuation of International Application No. PCT/JP2020/038389, filed on Oct. 9, 2020, the entire contents of which are incorporated herein by reference.

FIELD

The present invention relates to an image processing device, an image processing method, and a computer-readable medium.

BACKGROUND

A technique for generating a combined image from an arbitrary viewpoint using a projection image obtained by projecting a photographed image around a moving body on a virtual projection surface is disclosed.

Conventional techniques are described in JP 2013-207637 A, JP 2014-531078 A, JP 2009-232310 A, JP 2019-140518 A, JP 2019-153138 A, and "Environment Recognition of Mobile Robot-Map Construction and Self-Position Estimation" System/Control/Information (Journal of System Information Society), Vol. 60 No. 12, pp 509-514, 2016.

However, in a case where a combined image obtained by superimposing a plurality of images is projected and displayed on a projection surface, there is a case where a problem such as double parking lot lines on a horizontal surface occurs in the projected combined image.

In one aspect, an object of the present invention is to provide an image processing device, an image processing method, and a computer-readable medium that solve a problem in a case where a combined image obtained by superimposing a plurality of images is projected and displayed on a projection surface.

SUMMARY

In an aspect, an image processing device disclosed in the present application includes a hardware processor configured to function as a determination unit and an image generation unit. The determination unit determines a boundary region in a region where spatially adjacent peripheral images of a plurality of peripheral images of a moving body overlap with each other, using position information including a plurality of detection points around the moving body and self-position information of the moving body. The image generation unit generates a combined image, using the spatially adjacent peripheral images, using the boundary region.

DETAILED DESCRIPTION

Hereinafter, embodiments of an image processing device, an image processing method, and a computer-readable medium disclosed in the present application will be described in detail with reference to the accompanying drawings. Note that the following embodiments do not limit the disclosed technology. The embodiments can be appropriately combined within a range in which the processing contents do not contradict each other.

First Embodiment

Figure 1:
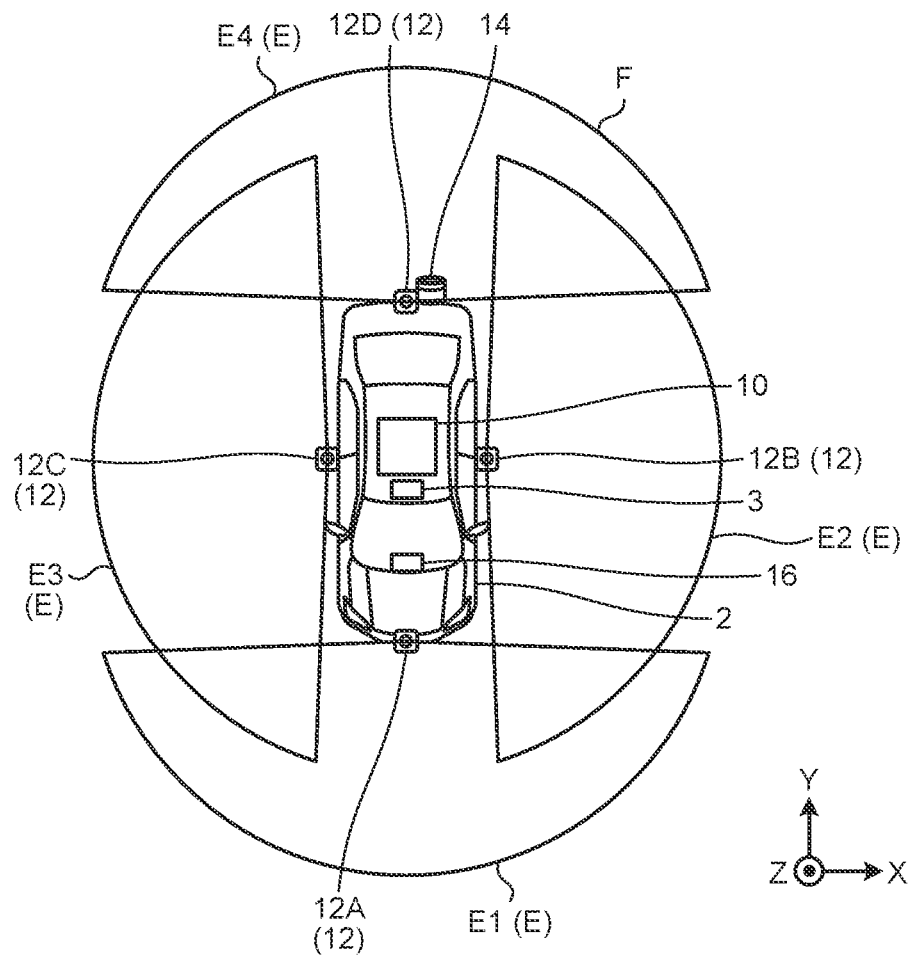
FIG. 1 is a diagram illustrating an overall configuration of an image processing system according to a first embodiment.

FIG. 1 is a diagram illustrating an example of an overall configuration of an image processing system 1 of the present embodiment. The image processing system 1 includes an image processing device 10, a photographing unit 12, a detection unit 14, and a display unit 16. The image processing device 10, the photographing unit 12, the detection unit 14, and the display unit 16 are connected so as to be able to exchange data or signals.

In the present embodiment, a mode in which the image processing device 10, the photographing unit 12, the detection unit 14, and the display unit 16 are mounted on a moving body 2 will be described as an example. Note that the image processing device 10 according to the first embodiment is an example of using visual SLAM.

The moving body 2 is a movable object. The moving body 2 is, for example, a vehicle, a flying object (manned airplane, unmanned airplane (for example, an unmanned aerial vehicle (UAV) and a drone)), a robot, or the like. In addition, the moving body 2 is, for example, a moving body that travels through a driving operation by a person or a moving body that can automatically travel (autonomously travel) without through a driving operation by a person. In the present embodiment, a case where the moving body 2 is a vehicle will be described as an example. Examples of the vehicle include a two-wheeled automobile, a three-wheeled automobile, and a four-wheeled automobile. In the present embodiment, a case where the vehicle is an autonomously traveling four-wheeled vehicle will be described as an example.

Note that the present invention is not limited to a mode in which all of the image processing device 10, the photographing unit 12, the detection unit 14, and the display unit 16 are mounted on the moving body 2. The image processing device 10 may be mounted on a stationary object. The stationary object is an object fixed to the ground. The stationary object is an immovable object or an object in a stationary state with respect to the ground. The stationary object is, for example, a traffic light, a parked vehicle, a road sign, or the like. Furthermore, the image processing device 10 may be mounted on a cloud server that executes processing on a cloud.

The photographing unit 12 photographs the periphery of the moving body 2 and acquires photographed image data. Hereinafter, the photographed image data will be simply referred to as a photographed image. The photographing unit 12 is, for example, a digital camera capable of photographing a moving image. Note that photographing refers to converting an image of a subject formed by an optical system such as a lens into an electric signal. The photographing unit 12 outputs the photographed image to the image processing device 10. Furthermore, in the present embodiment, a description will be given on the assumption that the photographing unit 12 is a monocular fisheye camera (for example, the viewing angle is 195 degrees).

In the present embodiment, a mode in which four photographing units 12 (photographing units 12A to 12D) are mounted on the moving body 2 will be described as an example. The plurality of photographing units 12 (photographing units 12A to 12D) photograph the subject in each photographing region E (photographing regions E1 to E4) to acquire the photographed image. Note that it is assumed that the plurality of photographing units 12 have different photographing directions. In addition, it is assumed that the photographing directions of the plurality of photographing units 12 are adjusted in advance such that the photographing regions E of the adjacent photographing units 12 at least partially overlap each other.

The four photographing units 12A to 12D are examples, and the number of photographing units 12 is not limited. For example, in a case where the moving body 2 has a vertically long shape like a bus or a truck, it is also possible to dispose the photographing units 12 one by one in the front, the rear, the front of the right side surface, the rear of the right side surface, the front of the left side surface, and the rear of the left side surface of the moving body 2, and use a total of six photographing units 12. That is, the number and arrangement positions of the photographing units 12 can be arbitrarily set according to the size and shape of the moving body 2. Note that the boundary angle determination processing to be described later can be realized by providing at least two photographing units 12.

The detection unit 14 detects position information of each of a plurality of detection points around the moving body 2. In other words, the detection unit 14 detects the position information of each of the detection points in the detection region F. The detection point indicates each of points individually observed by the detection unit 14 in the real space. The detection point corresponds to, for example, a three-dimensional object around the moving body 2. For example, the detection unit 14 irradiates the surroundings of the detection unit 14 with light and receives reflected light reflected at the reflection point. This reflection point corresponds to a detection point.

The position information of the detection point is information indicating the position of the detection point in the real space (three-dimensional space). For example, the position information of the detection point is information indicating the distance from the detection unit 14 (that is, the position of the moving body 2) to the detection point and the direction of the detection point with reference to the detection unit 14. These distances and directions can be expressed by, for example, positional coordinates indicating a relative position of the detection point with reference to the detection unit 14, positional coordinates indicating an absolute position of the detection point, a vector, or the like.

The detection unit 14 is, for example, a three-dimensional (3D) scanner, a two dimensional (2D) scanner, a distance sensor (millimeter wave radar and laser sensor), a sonar sensor that detects an object by sound waves, an ultrasonic sensor, or the like. The laser sensor is, for example, a three-dimensional laser imaging detection and ranging (LiDAR) sensor. Furthermore, the detection unit 14 may be a device using structure from motion (SfM) technology that measures a distance from an image photographed by a monocular camera. Furthermore, a plurality of photographing units 12 may be used as the detection unit 14. Furthermore, one of the plurality of photographing units 12 may be used as the detection unit 14.

The display unit 16 displays various types of information. The display unit 16 is, for example, a liquid crystal display (LCD), an organic electro-luminescence (EL) display, or the like.

In the present embodiment, the image processing device 10 is communicably connected to an electronic control unit (ECU) 3 mounted on the moving body 2. The ECU 3 is a unit that performs electronic control of the moving body 2. In the present embodiment, the image processing device 10 can receive controller area network (CAN) data such as a speed and a moving direction of the moving body 2 from the ECU 3.

Next, a hardware configuration of the image processing device 10 will be described.

Figure 2:
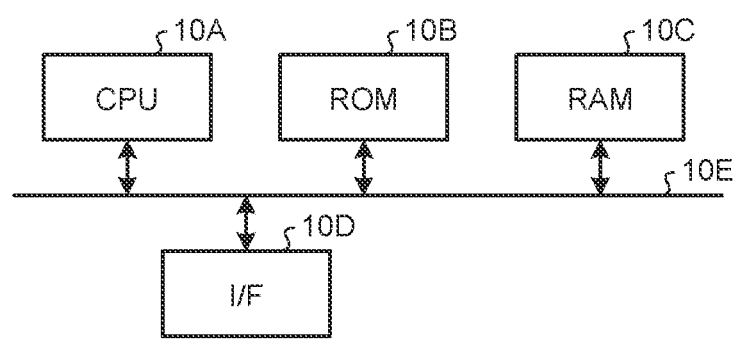
FIG. 2 is a diagram illustrating a hardware configuration of an image processing device according to the first embodiment.

FIG. 2 is a diagram illustrating an example of a hardware configuration of the image processing device 10.

The image processing device 10 includes a central processing unit (CPU) 10A, a read only memory (ROM) 10B, a random access memory (RAM) 10C, and an interface (I/F) 10D, and is, for example, a computer. The CPU 10A, the ROM 10B, the RAM 10C, and the I/F 10D are mutually connected by a bus 10E, and have a hardware configuration using a normal computer.

The CPU 10A is an arithmetic device that controls the image processing device 10. The CPU 10A corresponds to an example of a hardware processor. The ROM 10B stores programs and the like for realizing various processes by the CPU 10A. The RAM 10C stores data necessary for various processes by the CPU 10A. The I/F 10D is an interface for connecting to the photographing unit 12, the detection unit 14, the display unit 16, the ECU 3, and the like to transmit and receive data.

A program for executing image processing executed by the image processing device 10 of the present embodiment is provided by being incorporated in the ROM 10B or the like in advance. Note that the program executed by the image processing device 10 according to the present embodiment may be provided by being recorded in a recording medium as a file in a format that can be installed or executed in the image processing device 10. The recording medium is a computer-readable medium. The recording medium is a compact disc (CD)-ROM, a flexible disk (FD), a CD-R (recordable), a digital versatile disk (DVD), a universal serial bus (USB) memory, a secure digital (SD) card, or the like.

Next, a functional configuration of the image processing device 10 according to the present embodiment will be described. The image processing device 10 simultaneously estimates the position information of the detection point and the self-position information of the moving body 2 from the photographed image photographed by the photographing unit 12 by visual simultaneous localization and mapping (SLAM). The image processing device 10 connects a plurality of spatially adjacent photographed images to generate and displays a combined image overlooking the periphery of the moving body 2. In the present embodiment, the photographing unit 12 is used as the detection unit 14.

Figure 3:
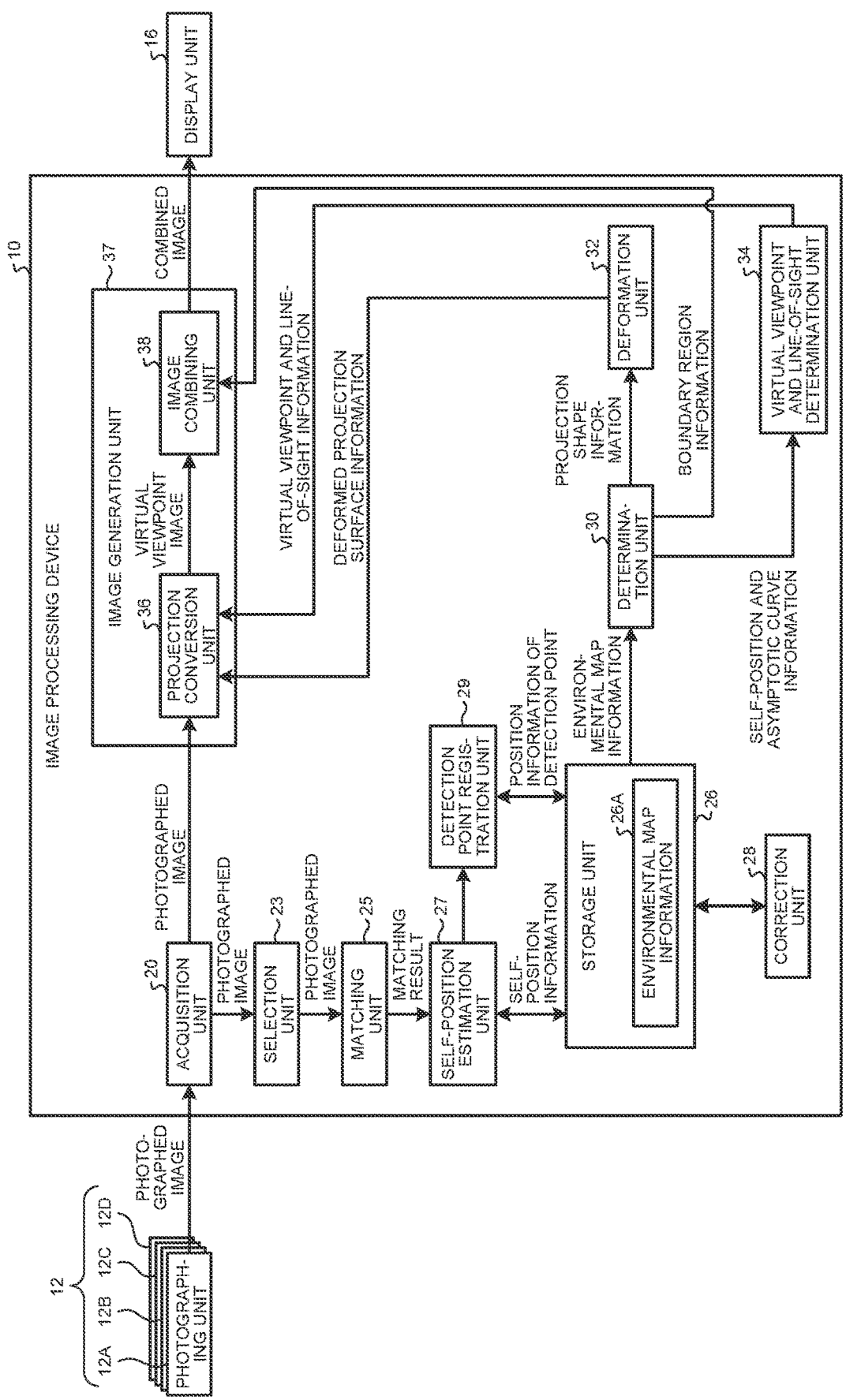
FIG. 3 is a diagram illustrating a functional configuration of the image processing device according to the first embodiment.

FIG. 3 is a diagram illustrating an example of a functional configuration of the image processing device 10. Note that, in order to clarify the data input/output relationship, FIG. 3 also illustrates the photographing unit 12 and the display unit 16 in addition to the image processing device 10.

The image processing device 10 includes an acquisition unit 20, a selection unit 23, a matching unit 25, a self-position estimation unit 27, a detection point registration unit 29, a storage unit 26, a correction unit 28, a determination unit 30, a deformation unit 32, a virtual viewpoint and line-of-sight determination unit 34, a projection conversion unit 36, and an image combining unit 38.

Some or all of the plurality of units may be realized, for example, by causing a processing device such as the CPU 10A to execute a program, that is, by software. In addition, some or all of the plurality of units may be realized by hardware such as an integrated circuit (IC), or may be realized using software and hardware in combination.

The acquisition unit 20 acquires a photographed image from the photographing unit 12. The acquisition unit 20 acquires photographed images from the respective photographing units 12 (photographing units 12A to 12D).

Every time a photographed image is acquired, the acquisition unit 20 outputs the acquired photographed image to the projection conversion unit 36 and the selection unit 23.

The selection unit 23 selects a detection region of a detection point. In the present embodiment, the selection unit 23 selects the detection region by selecting at least one photographing unit 12 among the plurality of photographing units 12 (photographing units 12A to 12D).

In the present embodiment, the selection unit 23 selects at least one of the photographing units 12 using the vehicle state information included in the CAN data received from the ECU 3, the detection direction information, or the instruction information input by the operation instruction by the user.

The vehicle state information is, for example, information indicating a traveling direction of the moving body 2, a state of a direction instruction of the moving body 2, a state of a gear of the moving body 2, and the like. The vehicle state information can be derived from the CAN data. The detection direction information is information indicating a direction in which information to be noted is detected, and can be derived by a point of interest (POI) technology. The instruction information is information indicating a direction to be noted, and is input by an operation instruction by the user.

For example, the selection unit 23 selects the direction of the detection region using the vehicle state information. Specifically, the selection unit 23 identifies parking information such as rear parking information indicating rear parking of the moving body 2 and tandem parking information indicating tandem parking using the vehicle state information. The selection unit 23 stores the parking information and the identification information of any one photographing unit 12 in advance in association with each other. For example, the selection unit 23 stores in advance identification information of a photographing unit 12D (see FIG. 1) that images the rear of the moving body 2 in association with the rear parking information. In addition, the selection unit 23 stores in advance the identification information of each of the photographing unit 12B and the photographing unit 12C (see FIG. 1) that images the left-right direction of the moving body 2 in association with the tandem parking information.

Then, the selection unit 23 selects the photographing unit 12 corresponding to the parking information derived from the received vehicle state information to select the direction of the detection region.

Furthermore, the selection unit 23 may select the photographing unit 12 having the direction indicated by the detection direction information as the photographing region E. Furthermore, the selection unit 23 may select the photographing unit 12 having the direction indicated by the detection direction information derived by the POI technology as the photographing region E.

The selection unit 23 outputs the photographed image photographed by the selected photographing unit 12 among the photographed images acquired by the acquisition unit 20 to the matching unit 25.

The matching unit 25 performs a feature amount extraction process and a matching process between images on a plurality of photographed images (a plurality of photographed images having different frames) having different photographing timings. Specifically, the matching unit 25 performs a feature amount extraction process from the plurality of photographed images. The matching unit 25 performs, for a plurality of photographed images having different photographing timings, matching processing of identifying corresponding points between the plurality of photographed images using a feature amount between the plurality of photographed images. The matching unit 25 outputs the matching processing result to the self-position estimation unit 27. In addition, the matching unit 25 registers information on the identified corresponding points between the plurality of photographed images in environmental map information 26A.

The storage unit 26 stores various types of data. The storage unit 26 is, for example, a semiconductor memory element such as a RAM or a flash memory, a hard disk, an optical disk, or the like. Note that the storage unit 26 may be a storage device provided outside the image processing device 10. Furthermore, the storage unit 26 may be a storage medium. Specifically, the storage medium may store or temporarily store a program or various types of information downloaded via a local area network (LAN), the Internet, or the like.

The environmental map information 26A is map information indicating a surrounding situation of the moving body 2. The environmental map information 26A is information in which the position information of each of the detection points and the self-position information of the moving body 2 are registered in a three-dimensional coordinate space with a predetermined position in the real space as an origin. The predetermined position in the real space may be determined on the basis of, for example, a preset condition.

For example, the predetermined position is a position of the moving body 2 when the image processing device 10 executes the image processing of the present embodiment. For example, it is assumed that image processing is executed at a predetermined timing such as a parking scene of the moving body 2. In this case, the image processing device 10 may set the position of the moving body 2 at the time of determining that the predetermined timing has been reached as the predetermined position. For example, when determining that the behavior of the moving body 2 has become the behavior indicating the parking scene, the image processing device 10 may determine that the predetermined timing has been reached. The behavior indicating the parking scene is, for example, a case where the speed of the moving body 2 becomes equal to or less than a predetermined speed, a case where the gear of the moving body 2 is set in the back gear, a case where a signal indicating the start of parking is received by a user's operation instruction, or the like. The predetermined timing is not limited to the parking scene.

Figure 4:
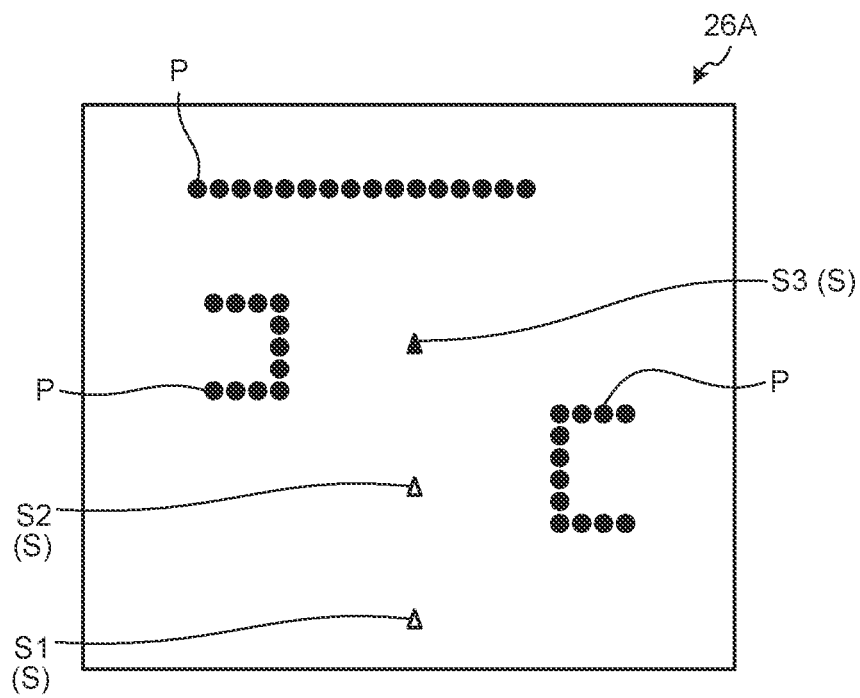
FIG. 4 is a schematic diagram of environmental map information according to the first embodiment.

FIG. 4 is a schematic diagram of an example of the environmental map information 26A. As illustrated in FIG. 4, the environmental map information 26A is information in which the position information of each detection point P and the self-position information of the self-position S of the moving body 2 are registered at the corresponding coordinate position in the three-dimensional coordinate space.

The self-position estimation unit 27 estimates the self-position information of the moving body 2 by triangulation using the information of the points identified as corresponding to each other included in the matching processing result acquired from the matching unit 25. Here, the self-position information is information indicating the posture of the moving body 2. The posture of the moving body 2 indicates the position and inclination of the moving body 2. The self-position information includes, for example, information such as the position of the moving body 2 and the direction of the photographing unit 12 corresponding to each of different photographing timings.

Then, the self-position estimation unit 27 registers the calculated self-position information in the environmental map information 26A.

Note that the self-position estimation unit 27 may estimate the self-position information using odometry. In this case, the self-position estimation unit 27 may estimate new self-position information by integral calculation by odometry using the self-position information calculated last time and the movement amount of the moving body 2. Note that the self-position estimation unit 27 can acquire the moving amount by reading the moving amount of the moving body 2 included in the CAN data acquired from the ECU 3.

The detection point registration unit 29 obtains the movement amount (translation amount and rotation amount) of the moving body 2 using the self-position information of the moving body 2 corresponding to each of the different photographing timings estimated by the self-position estimation unit 27. Then, relative coordinates (detection points) of corresponding points identified by the matching unit 25 between the plurality of photographed images with respect to the self-position of the moving body 2 are obtained from the movement amount.

Further, the detection point registration unit 29 registers the coordinates as the coordinates of the detection point P in the environmental map information 26A. The coordinates of the detection point P registered in the environmental map information 26A may be converted into coordinates with a predetermined position as an origin.

Therefore, the position information of the new detection point P and the self-position information of the self-position S are sequentially additionally registered in the environmental map information 26A as the moving body 2 moves. FIG. 4 illustrates the self-position S of the self-position S1 to the self-position S3 as an example. As the value of the numerical value following S is larger, it means that the self-position S is closer to the current timing.

The correction unit 28 corrects the position information of each of the plurality of detection points P registered in the environmental map information 26A and the self-position information of the moving body 2. The correction unit 28 corrects the position information and the self-position information registered in the environmental map information 26A using the position information of each of the corresponding detection points P acquired at the acquisition timing after the acquisition timing of the detection point P.

That is, the correction unit 28 corrects the position information of the detection point P registered in the environmental map information 26A using the position information of the detection point P newly registered by the detection point registration unit 29. At this time, the correction unit 28 may correct the position information and the self-position information by further using various parameters registered in the environmental map information 26A and used for calculating the position information of each of the detection points P. With this correction processing, the correction unit 28 corrects an error in the position information of the detection point P registered in the environmental map information 26A. The correction unit 28 may correct the position information of the detection point P registered in the environmental map information 26A using a least squares method or the like. The cumulative error of the position information of the detection point P is corrected by the correction processing by the correction unit 28.

The timing of the correction processing by the correction unit 28 is not limited. For example, the correction unit 28 may execute the correction processing at predetermined timings. The predetermined timing may be determined based on, for example, a preset condition. In the present embodiment, a case where the image processing device 10 includes the correction unit 28 will be described as an example. However, the image processing device 10 may not include the correction unit 28.

The determination unit 30 determines the projection shape of the projection surface using the position information of the detection points P accumulated in the environmental map information 26A, and generates the projection shape information. The determination unit 30 outputs the generated projection shape information to the deformation unit 32.

Here, the projection surface is a three-dimensional surface for projecting a peripheral image of the moving body 2. The peripheral image of the moving body 2 is a photographed image of the periphery of the moving body 2, and is a photographed image photographed by each of the photographing units 12A to 12D. The projection shape of the projection surface is a three-dimensional (3D) shape virtually formed in a virtual space corresponding to the real space. Furthermore, in the present embodiment, the determination of the projection shape of the projection surface executed by the determination unit 30 is referred to as "projection shape determination processing".

The determination unit 30 determines the boundary region using the position information including the plurality of detection points P around the moving body 2 and the self-position information of the moving body 2 accumulated in the environmental map information 26A, and generates the boundary region information. The determination unit 30 outputs the generated boundary region information to the image combining unit 38.

Here, in a case where a combined image is generated by spatially connecting a plurality of peripheral images of the moving body 2, the boundary region means a region where two peripheral images acquired by the photographing unit 12 spatially adjacent to each other among the photographing units 12A to 12D are superimposed. The boundary region is determined by, for example, a boundary angle corresponding to a center position of the boundary region and a boundary width. In the present embodiment, the determination of the boundary region executed by the determination unit 30 is referred to as "boundary region determination processing".

In addition, the determination unit 30 calculates an asymptotic curve using the position information including the plurality of detection points P around the moving body 2 and the self-position information of the moving body 2 accumulated in the environmental map information 26A, and generates the asymptotic curve information.

Figure 5:
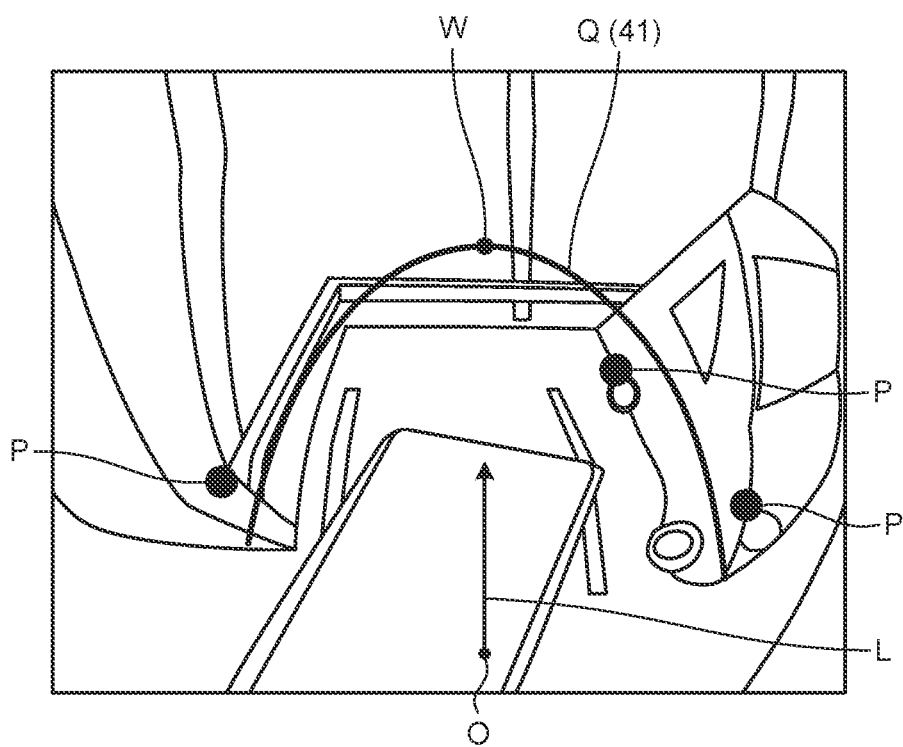
FIG. 5 is an explanatory diagram of an asymptotic curve according to the first embodiment.

FIG. 5 is an explanatory diagram of the asymptotic curve Q generated by the determination unit 30. Here, the asymptotic curve is an asymptotic curve of a plurality of detection points P in the environmental map information 26A. FIG. 5 is an example in which an asymptotic curve Q is illustrated in a projection image obtained by projecting a photographed image on a projection surface in a case where the moving body 2 is viewed from above. For example, it is assumed that the determination unit 30 identifies three detection points P in order of proximity to the self-position S of the moving body 2. In this case, the determination unit 30 generates the asymptotic curves Q of these three detection points P.

The determination unit 30 outputs the self-position and the asymptotic curve information to the virtual viewpoint and line-of-sight determination unit 34.

Note that the configuration of the determination unit 30 will be described in detail later.

The deformation unit 32 deforms the projection surface on the basis of the projection shape information received from the determination unit 30.

Figure 6:
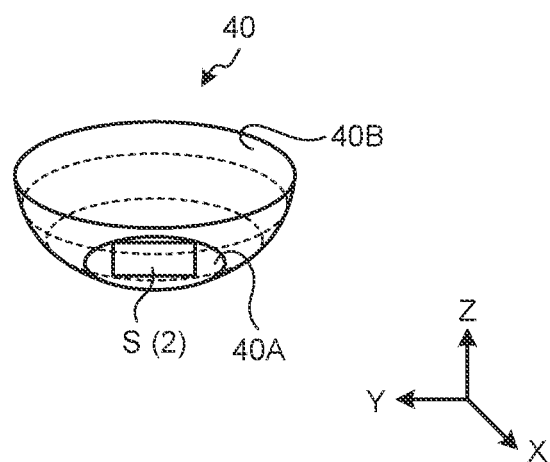
FIG. 6 is a schematic diagram illustrating an example of a reference projection surface according to the first embodiment.
Figure 7:
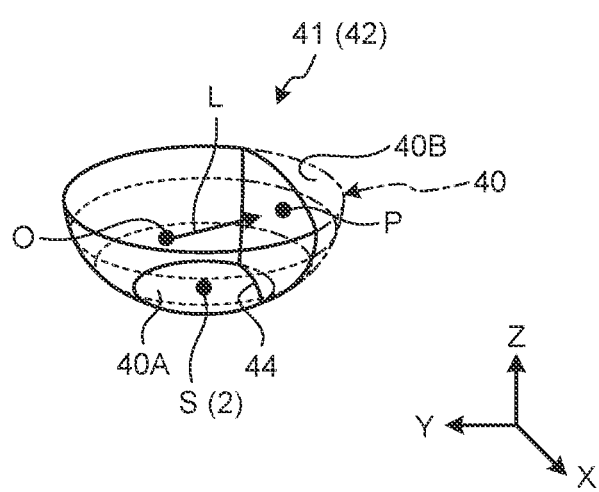
FIG. 7 is a schematic diagram illustrating an example of a projection shape determined by a shape determination unit according to the first embodiment.

FIG. 6 is a schematic view illustrating an example of reference projection surface 40. FIG. 7 is a schematic diagram illustrating an example of a projection shape 41 determined by the determination unit 30. That is, the deformation unit 32 deforms the reference projection surface illustrated in FIG. 6 stored in advance on the basis of the projection shape information, and determines a deformed projection surface 42 as the projection shape 41 illustrated in FIG. 7. The determination unit 30 generates deformed projection surface information on the basis of the projection shape 41. This deformation of the reference projection surface is performed with reference to the detection point P closest to the moving body 2. The deformation unit 32 outputs the deformed projection surface information to the projection conversion unit 36.

Furthermore, for example, the deformation unit 32 deforms the reference projection surface to a shape along the asymptotic curve of a predetermined number of a plurality of detection points P in order of proximity to the moving body 2 on the basis of the projection shape information.

Note that the deformation unit 32 preferably deforms the reference projection surface using the position information of the detection point P acquired before the first timing and the self-position information of the self-position S.

Here, the first timing is the latest timing at which the position information of the detection point P is detected by the matching unit 25, or any timing before the latest timing. For example, the detection point P acquired before the first timing includes position information of a specific object around the moving body 2, and the detection point P acquired at the first timing does not include position information of the specific object around the moving body 2. The determination unit 30 may determine the projection shape in the same manner as described above using the position information of the detection point P acquired before the first timing included in the environmental map information 26A. Then, the deformation unit 32 may generate the deformed projection surface in the same manner as described above using the projection shape information of the projection shape.

For example, the position information of the detection point P detected by the matching unit 25 at the first timing may not include the position information of the detection point P detected before the first timing. Even in this case, the deformation unit 32 can generate a deformed projection surface corresponding to the detection point P detected in the past.

The virtual viewpoint and line-of-sight determination unit 34 determines the virtual viewpoint and line-of-sight information on the basis of the self-position and the asymptotic curve information.

Determination of the virtual viewpoint and line-of-sight information will be described with reference to FIGS. 5 and 7. For example, the virtual viewpoint and line-of-sight determination unit 34 determines, as the line-of-sight direction, a direction that passes through the detection point P closest to the self-position S of the moving body 2 and is perpendicular to the deformed projection surface. Furthermore, for example, the virtual viewpoint and line-of-sight determination unit 34 fixes the direction of the visual direction L, and determines the coordinates of the virtual viewpoint O as an arbitrary Z coordinate and an arbitrary XY coordinate in a direction away from the asymptotic curve Q toward the self-position S. In this case, the XY coordinates may be coordinates at a position farther from the asymptotic curve Q than the self-position S. Then, the virtual viewpoint and line-of-sight determination unit 34 outputs virtual viewpoint and line-of-sight information indicating the virtual viewpoint O and the line-of-sight direction L to the projection conversion unit 36. Note that, as illustrated in FIG. 7, the line-of-sight direction L may be a direction from the virtual viewpoint O toward the position of the vertex W of the asymptotic curve Q.

The projection conversion unit 36 generates a projection image obtained by projecting the photographed image acquired from the photographing unit 12 on the deformed projection surface on the basis of the deformed projection surface information and the virtual viewpoint and line-of-sight information. The projection conversion unit 36 converts the generated projection image into a virtual viewpoint image and outputs the virtual viewpoint image to the image combining unit 38. Here, the virtual viewpoint image is an image in which the projection image is visually recognized in an arbitrary direction from the virtual viewpoint.

The projection image generation processing by the projection conversion unit 36 will be described in detail with reference to FIG. 7. The projection conversion unit 36 projects the photographed image onto the deformed projection surface 42. Then, the projection conversion unit 36 generates a virtual viewpoint image that is an image obtained by visually recognizing the photographed image projected on the deformed projection surface 42 in the line-of-sight direction L from an arbitrary virtual viewpoint O (not illustrated). The position of the virtual viewpoint O may be, for example, the latest self-position S of the moving body 2. In this case, the value of the XY coordinates of the virtual viewpoint O may be set as the value of the XY coordinates of the latest self-position S of the moving body 2. Further, the value of the Z coordinate (position in the vertical direction) of the virtual viewpoint O may be the value of the Z coordinate of the detection point P closest to the self-position S of the moving body 2. The line-of-sight direction L may be determined on the basis of a predetermined reference, for example.

The line-of-sight direction L may be, for example, a direction from the virtual viewpoint O toward the detection point P closest to the self-position S of the moving body 2. The line-of-sight direction L may be a direction that passes through the detection point P and is perpendicular to the deformed projection surface 42. The virtual viewpoint and line-of-sight information indicating the virtual viewpoint O and the line-of-sight direction L is created by the virtual viewpoint and line-of-sight determination unit 34.

For example, the virtual viewpoint and line-of-sight determination unit 34 may determine, as the line-of-sight direction L, a direction that passes through the detection point P closest to the self-position S of the moving body 2 and is perpendicular to the deformed projection surface 42. Furthermore, the virtual viewpoint and line-of-sight determination unit 34 may fix the direction in the visual direction L and determine the coordinates of the virtual viewpoint O as an arbitrary Z coordinate and an arbitrary XY coordinate in a direction away from the asymptotic curve Q toward the self-position S. In this case, the XY coordinates may be coordinates at a position farther from the asymptotic curve Q than the self-position S. Then, the virtual viewpoint and line-of-sight determination unit 34 outputs virtual viewpoint and line-of-sight information indicating the virtual viewpoint O and the line-of-sight direction L to the projection conversion unit 36. As illustrated in FIG. 6, the line-of-sight direction L may be a direction from the virtual viewpoint O toward the position of the vertex W of the asymptotic curve Q.

The projection conversion unit 36 receives the virtual viewpoint and line-of-sight information from the virtual viewpoint and line-of-sight determination unit 34. The projection conversion unit 36 receives the virtual viewpoint and line-of-sight information to identify the virtual viewpoint O and the line-of-sight direction L. Then, the projection conversion unit 36 generates a virtual viewpoint image, which is an image visually recognized from the virtual viewpoint O in the line-of-sight direction L, from the photographed image projected on the deformed projection surface 42. The projection conversion unit 36 outputs the virtual viewpoint image to the image combining unit 38.

The image combining unit 38 generates a combined image obtained by extracting a part or all of the virtual viewpoint image. For example, the image combining unit 38 performs joining processing of a plurality of virtual viewpoint images (here, four virtual viewpoint images corresponding to the photographing units 12A to 12D) in the boundary region, and blending processing of each image in the joining processing. Here, the blending processing is processing of blending spatially adjacent images in the boundary region at a predetermined ratio (blending ratio). The blend ratio can be set stepwise, for example, so as to change with distance from the center position of the boundary region. The value of the blend ratio and the stepwise setting of the blend ratio can be arbitrarily adjusted. The blending process may be omitted.

The image combining unit 38 outputs the generated combined image to the display unit 16. Note that the combined image may be a bird's-eye view image in which the upper side of the moving body 2 is the virtual viewpoint O, or may be a bird's-eye view image in which the inside of the moving body 2 is the virtual viewpoint O and the moving body 2 is displayed translucently.

Note that the projection conversion unit 36 and the image combining unit 38 constitute an image generation unit 37. The image generation unit 37 is an example of an image generation unit that generates a combined image using the spatially adjacent peripheral images using the boundary region.

Configuration Example of Determination Unit 30

Next, an example of a detailed configuration of the determination unit 30 will be described.

Figure 8:
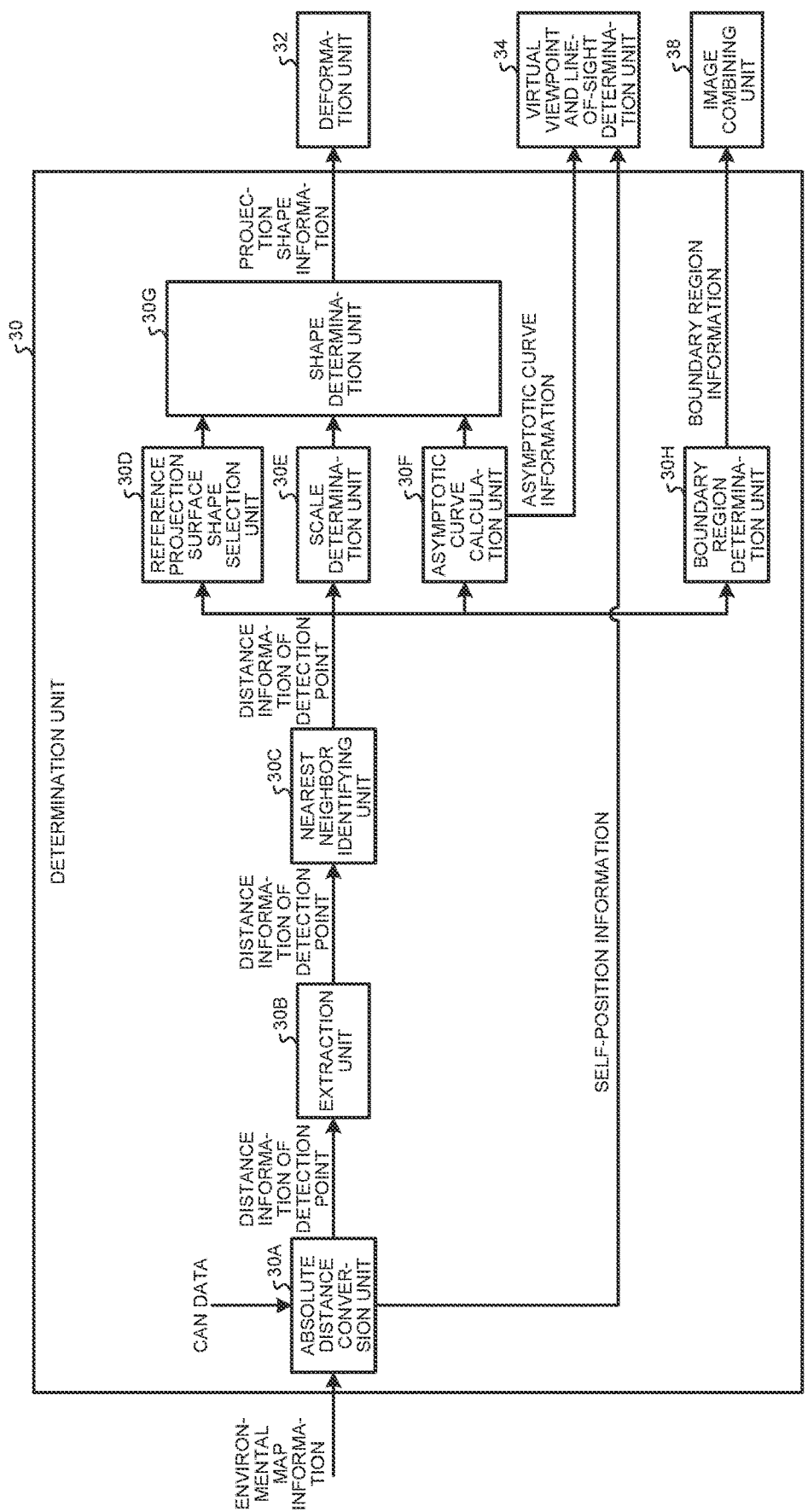
FIG. 8 is a schematic diagram illustrating an example of a functional configuration of a determination unit according to the first embodiment.

FIG. 8 is a schematic diagram illustrating an example of the configuration of the determination unit 30. As illustrated in FIG. 8, the determination unit 30 includes an absolute distance conversion unit 30A, an extraction unit 30B, a nearest neighbor identifying unit 30C, a reference projection surface shape selection unit 30D, a scale determination unit 30E, an asymptotic curve calculation unit 30F, a shape determination unit 30G, and a boundary region determination unit 30H.

The absolute distance conversion unit 30A reads the environmental map information 26A from the storage unit 26. The absolute distance conversion unit 30A converts the position information of each of the plurality of detection points P included in the read environmental map information 26A into distance information of an absolute distance from a current position that is the latest self-position S of the moving body 2 to each of the plurality of detection points P. When the detection unit 14 acquires the distance information of the detection point P, the absolute distance conversion unit 30A may be omitted.

Specifically, the absolute distance conversion unit 30A calculates the current position of the moving body 2 using the speed data of the moving body 2 included in the CAN data received from the ECU 3 of the moving body 2.

Specifically, for example, the absolute distance conversion unit 30A calculates the distance between the self-positions S registered in the environmental map information 26A using the speed data of the moving body 2 included in the CAN data. For example, the environmental map information 26A illustrated in FIG. 4 is assumed. In this case, the absolute distance conversion unit 30A calculates the distance between the self-position S1 and the self-position S2 and the distance between the self-position S2 and the self-position S3 using the velocity data included in the CAN data. Then, the absolute distance conversion unit 30A calculates the current position of the moving body 2 using these distances.

Then, the absolute distance conversion unit 30A calculates distance information which is a distance from the current position of the moving body 2 to each of the plurality of detection points P included in the environmental map information 26A. Specifically, the absolute distance conversion unit 30A converts the position information of each of the plurality of detection points P included in the environmental map information 26A into distance information from the current position of the moving body 2. With this processing, the absolute distance conversion unit 30A calculates distance information that is the absolute distance of each of the detection points P.

Then, the absolute distance conversion unit 30A outputs the calculated distance information of each of the plurality of detection points P to the extraction unit 30B. Furthermore, the absolute distance conversion unit 30A outputs the calculated current position of the moving body 2 to the virtual viewpoint and line-of-sight determination unit 34 as self-position information of the moving body 2.

The extraction unit 30B extracts a detection point P present within a specific range from among the plurality of detection points P for which the distance information has been received from the absolute distance conversion unit 30A. The specific range is, for example, a range from a road surface on which the moving body 2 is disposed to a height corresponding to the vehicle height of the moving body 2. The range is not limited to this range.

When the extraction unit 30B extracts the detection point P within the range, for example, the detection point P of the object that obstructs the travel of the moving body 2 can be extracted.

Then, the extraction unit 30B outputs the distance information of each of the extracted detection points P to the nearest neighbor identifying unit 30C.

The nearest neighbor identifying unit 30C divides the periphery of the self-position S of the moving body 2 for each specific angular range, and identifies the detection point P closest to the moving body 2 or the plurality of detection points P in order of proximity to the moving body 2 for each angular range. The nearest neighbor identifying unit 30C identifies the detection point P using the distance information received from the extraction unit 30B. In the present embodiment, a mode in which the nearest neighbor identifying unit 30C identifies a plurality of detection points P in order of proximity to the moving body 2 for each angular range will be described as an example.

The nearest neighbor identifying unit 30C outputs the distance information of the detection point P identified for each angular range to the reference projection surface shape selection unit 30D, the scale determination unit 30E, the asymptotic curve calculation unit 30F, and the boundary region determination unit 30H.

The reference projection surface shape selection unit 30D selects the shape of the reference projection surface.

Here, the reference projection surface will be described in detail with reference to FIG. 6. The reference projection surface 40 is, for example, a projection surface having a shape serving as a reference when the shape of the projection surface is changed. The shape of the reference projection surface 40 is, for example, a bowl shape, a cylindrical shape, or the like. Note that FIG. 6 illustrates a bowl-shaped reference projection surface 40.

The bowl shape has a bottom surface 40A and a side wall surface 40B, and one end of the side wall surface 40B is continuous to the bottom surface 40A and the other end is opened. The width of the horizontal cross-section of the side wall surface 40B increases from the bottom surface 40A side toward the opening side of the other end. The bottom surface 40A has, for example, a circular shape. Here, the circular shape is a shape including a perfect circular shape and a circular shape other than the perfect circular shape such as an elliptical shape. The horizontal cross-section is an orthogonal plane orthogonal to the vertical direction (arrow Z direction). The orthogonal plane is a two-dimensional plane along an arrow X direction orthogonal to the arrow Z direction and an arrow Y direction orthogonal to the arrow Z direction and the arrow X direction. Hereinafter, the horizontal cross-section and the orthogonal plane may be referred to as an XY plane. Note that the bottom surface 40A may have a shape other than a circular shape such as an egg shape.

The cylindrical shape is a shape including a circular bottom surface 40A and a side wall surface 40B continuous to the bottom surface 40A. The side wall surface 40B constituting the cylindrical reference projection surface 40 has a cylindrical shape in which an opening at one end is continuous to the bottom surface 40A and the other end is opened. However, the side wall surface 40B constituting the cylindrical reference projection surface 40 has a shape in which the diameter of the XY plane is substantially constant from the bottom surface 40A side toward the opening side of the other end. Note that the bottom surface 40A may have a shape other than a circular shape such as an egg shape.

In the present embodiment, a case where the shape of the reference projection surface 40 is a bowl shape illustrated in FIG. 6 will be described as an example. The reference projection surface 40 is a three-dimensional model virtually formed in a virtual space in which the bottom surface 40A is a surface substantially coinciding with the road surface below the moving body 2 and the center of the bottom surface 40A is the self-position S of the moving body 2.

The reference projection surface shape selection unit 30D selects the shape of the reference projection surface 40 by reading one specific shape from the storage unit 26 that stores the shapes of the plurality of types of reference projection surfaces 40. For example, the reference projection surface shape selection unit 30D selects the shape of the reference projection surface 40 according to the positional relationship between the self-position and the surrounding three-dimensional object, distance information, and the like. Note that the shape of the reference projection surface 40 may be selected by a user's operation instruction. The reference projection surface shape selection unit 30D outputs the determined shape information of the reference projection surface 40 to the shape determination unit 30G. In the present embodiment, as described above, a mode in which the reference projection surface shape selection unit 30D selects the bowl-shaped reference projection surface 40 will be described as an example.

The scale determination unit 30E determines the scale of the reference projection surface 40 having the shape selected by the reference projection surface shape selection unit 30D. For example, in a case where there are a plurality of detection points P in a range of a predetermined distance from the self-position S, the scale determination unit 30E determines to reduce the scale. The scale determination unit 30E outputs scale information of the determined scale to the shape determination unit 30G.

The asymptotic curve calculation unit 30F outputs the asymptotic curve information of the calculated asymptotic curve Q to the shape determination unit 30G and the virtual viewpoint and line-of-sight determination unit 34 using each piece of the distance information of the detection point P closest to the self-position S for each angular range from the self-position S received from the nearest neighbor identifying unit 30C. Note that the asymptotic curve calculation unit 30F may calculate the asymptotic curve Q of the detection point P accumulated for each of the plurality of portions of the reference projection surface 40. Then, the asymptotic curve calculation unit 30F may output the asymptotic curve information of the calculated asymptotic curve Q to the shape determination unit 30G and the virtual viewpoint and line-of-sight determination unit 34.

The shape determination unit 30G enlarges or reduces the reference projection surface 40 having the shape indicated by the shape information received from the reference projection surface shape selection unit 30D to the scale of the scale information received from the scale determination unit 30E. Then, the shape determination unit 30G determines, as the projection shape, a shape obtained by deforming the enlarged or reduced reference projection surface 40 so as to have a shape corresponding to the asymptotic curve information of the asymptotic curve Q received from the asymptotic curve calculation unit 30F.

Here, the determination of the projection shape will be described in detail with reference to FIG. 7. As illustrated in FIG. 7, the shape determination unit 30G determines, as the projection shape 41, a shape obtained by deforming the reference projection surface 40 into a shape passing through the detection point P closest to the self-position S of the moving body 2, which is the center of the bottom surface 40A of the reference projection surface 40. The shape passing through the detection point P means that the side wall surface 40B after deformation has a shape passing through the detection point P. The self-position S is the latest self-position S calculated by the self-position estimation unit 27. The shape passing through the detection point P means that the side wall surface 40B after deformation has a shape passing through the detection point P.

That is, the shape determination unit 30G identifies the detection point P closest to the self-position S among the plurality of detection points P registered in the environmental map information 26A. Specifically, the XY coordinates of the center position (self-position S) of the moving body 2 is set as (X, Y)=(0, 0). Then, the shape determination unit 30G identifies the detection point P at which the value of $X^2+Y^2$ indicates the minimum value as the detection point P closest to the self-position S. Then, the shape determination unit 30G determines, as the projection shape 41, a shape obtained by deforming the side wall surface 40B of the reference projection surface 40 so as to have a shape passing through the detection point P.

More specifically, the shape determination unit 30G determines the deformed shape of the partial region of the bottom surface 40A and the partial region of the side wall surface 40B as the projection shape 41 so that the partial region of the side wall surface 40B becomes a wall surface passing through the detection point P closest to the moving body 2 when the reference projection surface 40 is deformed. The deformed projection shape 41 is, for example, a shape rising from a rising line 44 on the bottom surface 40A toward the center of the bottom surface 40A. Rising means, for example, bending or folding a part of the side wall surface 40B and the bottom surface 40A in a direction toward the center of the bottom surface 40A so that an angle formed by the side wall surface 40B and the bottom surface 40A of the reference projection surface 40 becomes a smaller angle.

The shape determination unit 30G determines a specific region on the reference projection surface 40 to be deformed so as to protrude to a position passing through the detection point P at a viewpoint (plan view) of the XY plane. The shape and range of the specific region may be determined on the basis of a predetermined standard. Then, the shape determination unit 30G determines the shape of the deformed reference projection surface 40 such that the distance from the self-position S is continuously increased from the protruding specific region toward the region other than the specific region on the side wall surface 40B.

For example, as illustrated in FIG. 7, it is preferable to determine the projection shape 41 so that the shape of the outer periphery of the cross-section along the XY plane is a curved shape. Note that the shape of the outer periphery of the section of the projection shape 41 is, for example, a circular shape, but may be a shape other than the circular shape.

Note that the shape determination unit 30G may determine a shape obtained by deforming the reference projection surface 40 so as to have a shape along the asymptotic curve as the projection shape 41. The shape determination unit 30G generates an asymptotic curve of a predetermined number of the plurality of detection points P in a direction away from the detection point P closest to the self-position S of the moving body 2. The number of detection points P may be plural. For example, the number of detection points P is preferably three or more. In this case, the shape determination unit 30G preferably generates an asymptotic curve of a plurality of detection points P at positions separated by a predetermined angle or more as viewed from the self-position S. For example, the shape determination unit 30G can determine, as the projection shape 41, a shape obtained by deforming the reference projection surface 40 so as to have a shape along the generated asymptotic curve Q in the asymptotic curve Q illustrated in FIG. 6.

Note that the shape determination unit 30G may divide the periphery of the self-position S of the moving body 2 for each specific angular range, and may identify the detection point P closest to the moving body 2 or the plurality of detection points P in order of proximity to the moving body 2 for each angular range. Then, the shape determination unit 30G may determine, as the projection shape 41, a shape obtained by deforming the reference projection surface 40 so as to have a shape passing through the identified detection point P or a shape along the asymptotic curve Q of the plurality of identified detection points P for each angular range.

In addition, the timing at which the shape determination unit 30G determines the projection shape 41 is not limited. For example, in the present embodiment, the shape determination unit 30G may determine the projection shape 41 using a photographed image obtained at a timing when the size of the subject included in the detection region selected by the selection unit 23 becomes larger by the movement of the moving body 2.

Then, the shape determination unit 30G outputs the projection shape information of the determined projection shape 41 to the deformation unit 32.

The boundary region determination unit 30H executes boundary region determination processing of determining the boundary regions of the plurality of peripheral images of the moving body 2 using the position information including the plurality of detection points P around the moving body 2 and the self-position information of the moving body 2 accumulated in the environmental map information 26A. That is, the boundary region determination unit 30H determines the boundary region on the basis of the position of the nearest detection point P identified by the nearest neighbor identifying unit 30C.

Figure 9:
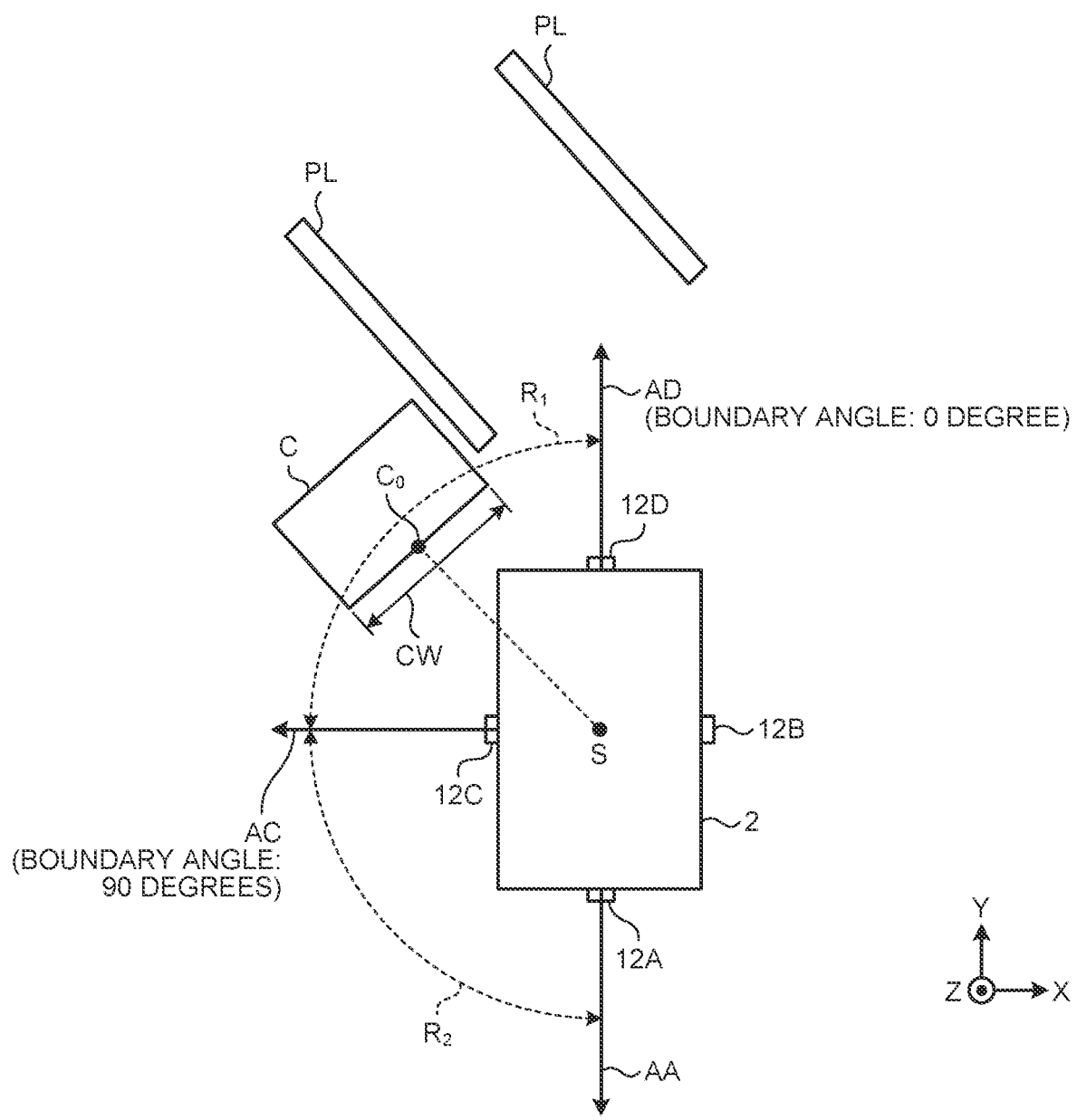
FIG. 9 is a diagram for explaining a boundary angle and a boundary width.

FIG. 9 is a diagram for explaining a boundary angle and a boundary width. FIG. 9 illustrates a line-of-sight direction AA of the photographing unit 12A, a line-of-sight direction AC of the photographing unit 12C, a line-of-sight direction AD of the photographing unit 12D, and angular ranges $R_1$ and $R_2$ in which boundary angles are set when the moving body 2 is viewed from directly above. The column C is the nearest three-dimensional object from the moving body 2. $C_0$ represents the center position of the column C viewed from the moving body 2, and CW represents the width of the column C viewed from the moving body 2. In the situation illustrated in FIG. 9, it is assumed that the moving body 2 is parked behind the parking lot line PL. In such a case, the line-of-sight direction AD of the photographing unit 12D corresponds to a boundary angle of 0 degrees, and the line-of-sight direction AC of the photographing unit 12C corresponds to a boundary angle of 90 degrees.

The boundary region determination unit 30H identifies the center position $C_0$ and the width CW of the column C, which is the three-dimensional object closest to the moving body 2, based on the position of the nearest detection point P identified by the nearest neighbor identifying unit 30C. The boundary region determination unit 30H determines a boundary angle (for example, 45 degrees) corresponding to the identified center position $C_0$ of the column C. The boundary region determination unit 30H determines an angle range corresponding to a predetermined boundary width based on the boundary angle.

It is preferable that the boundary width does not exceed the width CW of the column C, which is the three-dimensional object closest to the moving body 2. In addition, by adjusting the boundary width, the boundary region can have an arbitrary size. For example, the size of the boundary region may be set based on the detected width CW of the column C. In addition, in the example of FIG. 9, a case where the boundary angle is set in the angular range $R_1$ of 0 degrees to 90 degrees has been exemplified for easy understanding of the description. On the other hand, for example, in a case where the photographing unit 12 has a photographing range of about 195 degrees, the boundary angle can be set to an angle of 90 degrees or more.

Note that FIG. 9 illustrates a case where only the column C is present around the moving body 2. On the other hand, when there are a plurality of three-dimensional objects around the moving body 2, the boundary region determination unit 30H determines the boundary region with reference to the nearest three-dimensional object. Furthermore, the boundary region determination unit 30H determines a boundary region for a three-dimensional object having a size that satisfies a predetermined standard (for example, a size that satisfies a size detectable by visual SLAM).

In addition, when the moving body 2 further moves backward from the situation illustrated in FIG. 9, for example, the column C moves to the diagonally right front side of the moving body 2. In this case, in the angular range $R_2$ between the line-of-sight direction AC of the photographing unit 12C and the line-of-sight direction AA of the photographing unit 12A, the boundary region determination unit 30H similarly sets the boundary angle in accordance with the movement of the moving body 2, and determines the boundary region. This is because the image processing device 10 continuously generates the environmental map information 26A, so that the positional relationship between the moving body 2 and the column C can be determined in real time.

In the example illustrated in FIG. 9, the case where the nearest three-dimensional object from the moving body 2 is the column C has been exemplified. On the other hand, when the nearest three-dimensional object from the moving body 2 is a wall instead of the column C, the boundary region determination unit 30H determines the boundary region with reference to the nearest wall portion from the moving body 2. In addition, for example, in a case where the entire right side surface of the moving body 2 has become a wall, the boundary region determination unit 30H determines the nearest wall portion from the moving body 2 using, for example, a top view image (top view) of the moving body 2, and determines the boundary region based on the portion.

The boundary region determination unit 30H outputs the determined boundary angle and a predetermined angle range based on the boundary angle as boundary region information to the image combining unit 38.

Next, the boundary region adaptation control realized by the image processing device 10 according to the present embodiment will be described in detail. Here, the boundary region adaptation control solves a problem in a case where a combined image obtained by connecting a plurality of peripheral images is projected and displayed on a projection surface by setting a boundary region with a three-dimensional object closest to the moving body 2 as a reference.

Note that, in the following, for the sake of concrete explanation, a case where a combined image is generated using a peripheral image photographed by the photographing unit 12D arranged behind the moving body 2 and a peripheral image photographed by the photographing unit 12C arranged on the right side surface is taken as an example, similarly to the situation illustrated in FIG. 9.

In the following, as an example, a case where the projection shape adaptation control is used together with the boundary region adaptation control will be described. Here, by setting the projection shape with a three-dimensional object closest to the moving body 2 as a reference, a problem in a case where an image is projected and displayed on a projection surface is solved. However, the use of the projection shape adaptation control together with the boundary region adaptation control is merely an example. That is, the boundary region adaptation control can be used alone regardless of the projection shape adaptation control.

Figure 10:
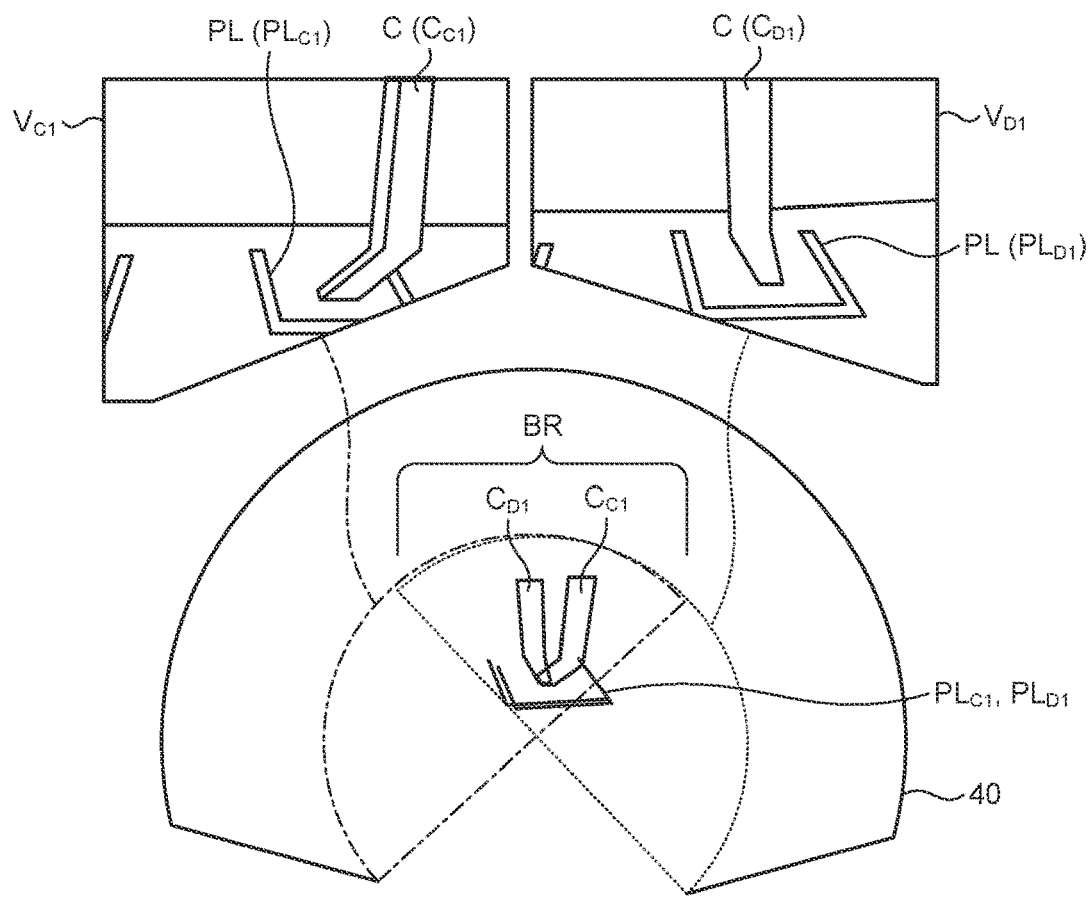
FIG. 10 is a conceptual diagram illustrating processing of projecting a combined image onto a reference projection surface.
Figure 11:
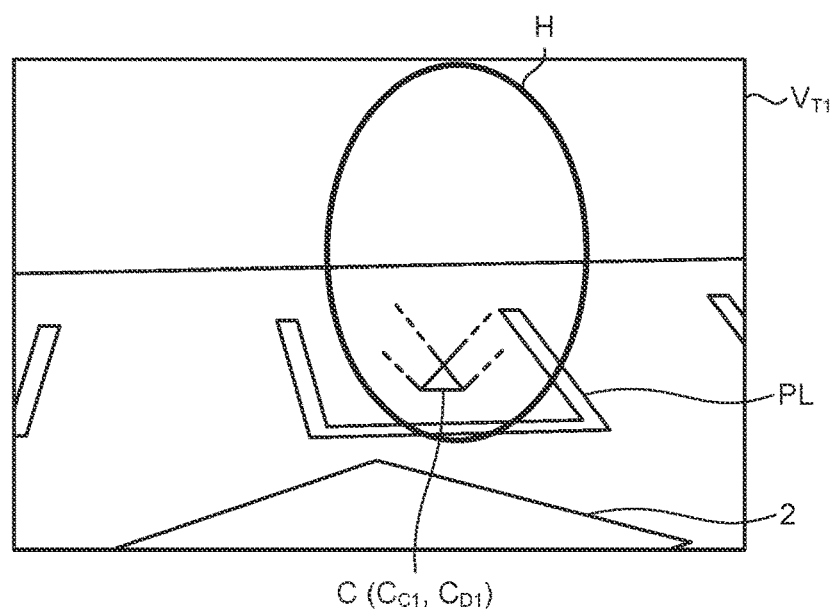
FIG. 11 is a view schematically illustrating an example of the combined image illustrated in FIG. 10.

FIG. 10 illustrates a situation in a case where the moving body 2 is parked rearward in the parking lot line PL (parking space) near the column C. FIG. 10 is a conceptual diagram illustrating a peripheral image $V_{C1}$ obtained by performing perspective projection conversion on an image photographed by the photographing unit 12C and a peripheral image $V_{D1}$ obtained by performing perspective projection conversion on an image photographed by the photographing unit 12D. Furthermore, FIG. 11 is a diagram schematically illustrating an example of a combined image $V_{T1}$ generated by combining the peripheral image $V_{C1}$ and the peripheral image $V_{D1}$.

In FIG. 10, the column Cm and the parking lot line $PL_{C1}$ indicate the column C and the parking lot line PL imaged in the peripheral image $V_{C1}$, and the column Cm and the parking lot line $PL_{D1}$ indicate the column C and the parking lot line PL imaged in the peripheral image $V_{D1}$, respectively. In addition, the lower side of FIG. 10 illustrates a state in which the column Cm, the parking lot line $PL_{C1}$, the column $C_{D1}$, the parking lot line $PL_{D1}$, and the boundary region BR are projected on the reference projection surface 40 in a case where the peripheral image $V_{C1}$ and the peripheral image $V_{C1}$ are superimposed.

In FIG. 10, the column $C_{D1}$ of the peripheral image $V_{C1}$ and the column Cm of the peripheral image $V_{C1}$ projected on the reference projection surface 40 do not overlap each other in some portions on the side surface of the reference projection surface 40 in the boundary region BR. In the boundary region BR, the peripheral image $V_{C1}$ and the peripheral image $V_{C1}$ are blended at a predetermined ratio. Therefore, for example, as illustrated in a region H of FIG. 11, a part of the column C on the combined image $V_{T1}$ may be in a state of not being imaged and being lost.

Figure 12:
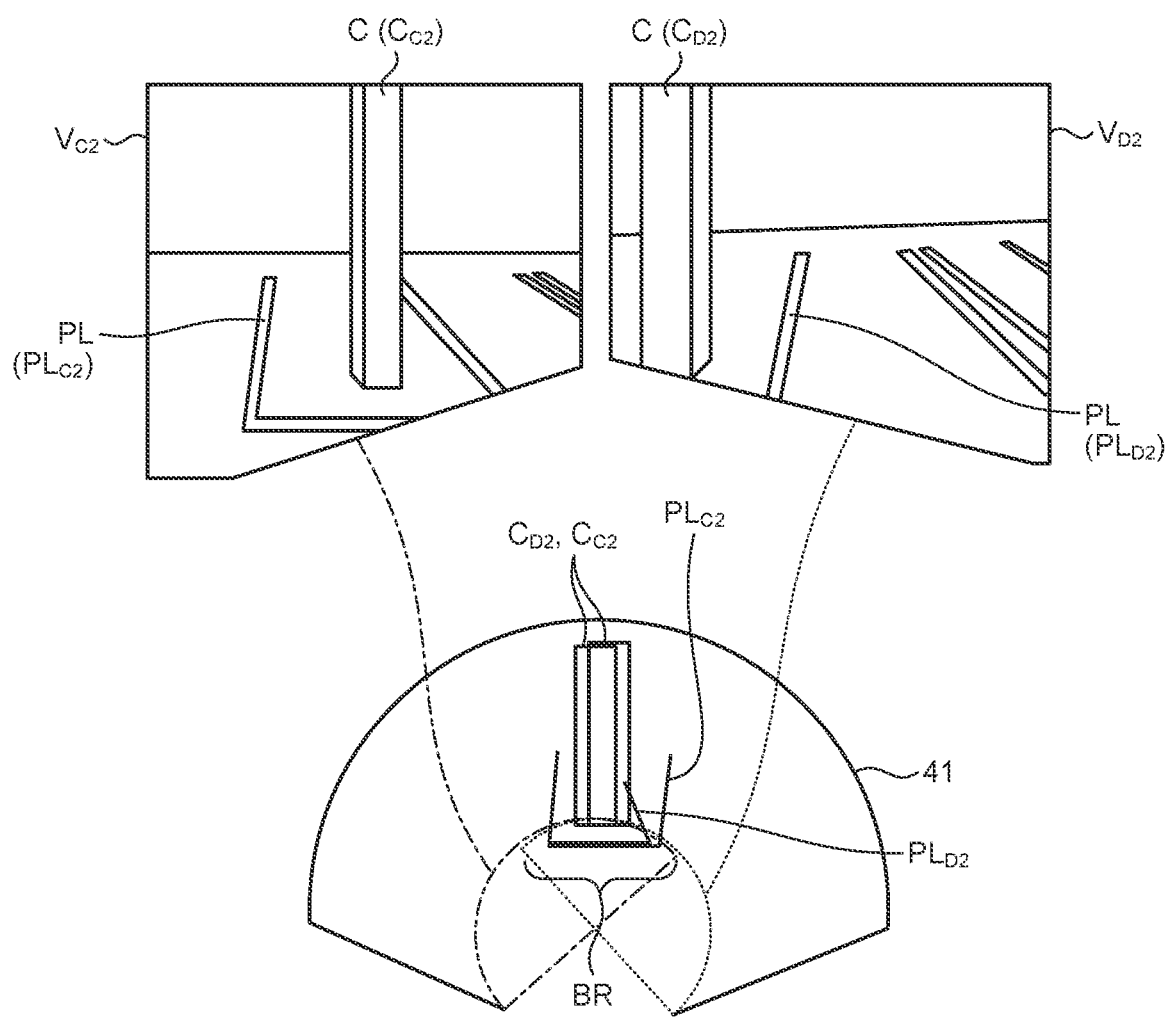
FIG. 12 is a conceptual diagram illustrating processing of projecting a combined image in a case where the projection shape determination processing is executed on the reference projection surface illustrated in FIG. 10.
Figure 13:
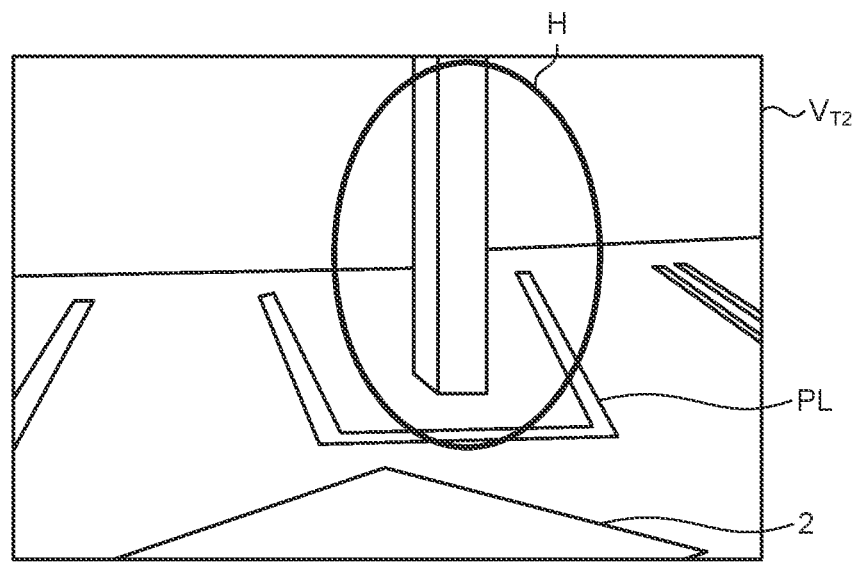
FIG. 13 is a view schematically illustrating an example of the combined image illustrated in FIG. 12.

FIG. 12 is a conceptual diagram illustrating a case where the projection shape adaptation control is executed on the reference projection surface 40 illustrated in FIG. 10 and the reference projection surface 40 is deformed into the projection shape 41. FIG. 12 illustrates a peripheral image $V_{C2}$ obtained by performing perspective projection conversion on the image photographed by the photographing unit 12C and a peripheral image $V_{D2}$ obtained by performing perspective projection conversion on the image photographed by the photographing unit 12D with respect to the projection shape 41. FIG. 13 is a diagram schematically illustrating an example of the combined image $V_{T2}$ illustrated in FIG. 12. In FIG. 12, a column $C_{C2}$ and a parking lot line $PL_{C2}$ indicate a column C and a parking lot line PL imaged in the peripheral image $V_{C2}$, respectively, and a column $C_{D2}$ and a parking lot line $PL_{D2}$ indicate a column C and a parking lot line PL imaged in the peripheral image $V_{D2}$, respectively.

As illustrated in FIG. 12, the projection shape 41 is generated based on the position of the column C, which is the nearest three-dimensional object, by the projection shape adaptation control. Therefore, the deviation between the column $C_{C2}$ and the column $C_{D2}$ in the boundary region BR on the side surface of the projection shape 41 is eliminated. As a result, for example, as illustrated in a region H of FIG. 13, the column C is imaged on the combined image $V_{T2}$, and the loss of a part of the column C on the combined image $V_{T2}$ is eliminated.

Figure 14:
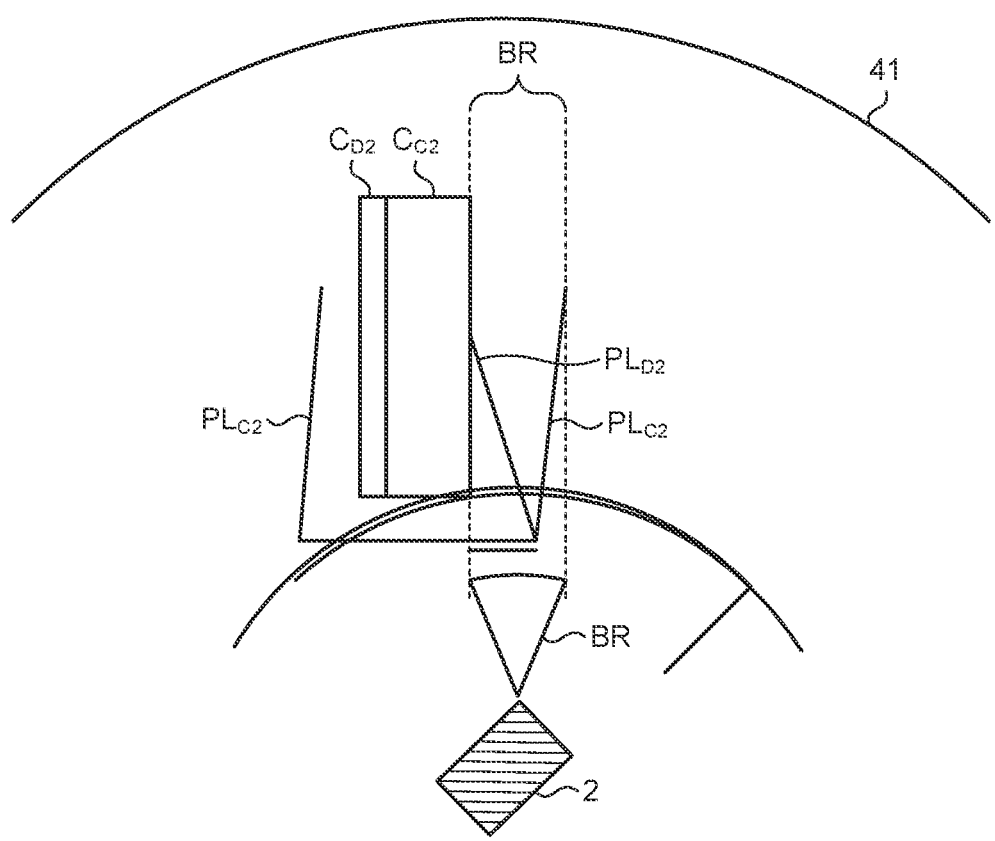
FIG. 14 is a conceptual diagram illustrating processing of projecting a combined image onto a projection shape in a case where the moving body further travels toward a parking lot line from the state illustrated in FIGS. 12 and 13.
Figure 15:
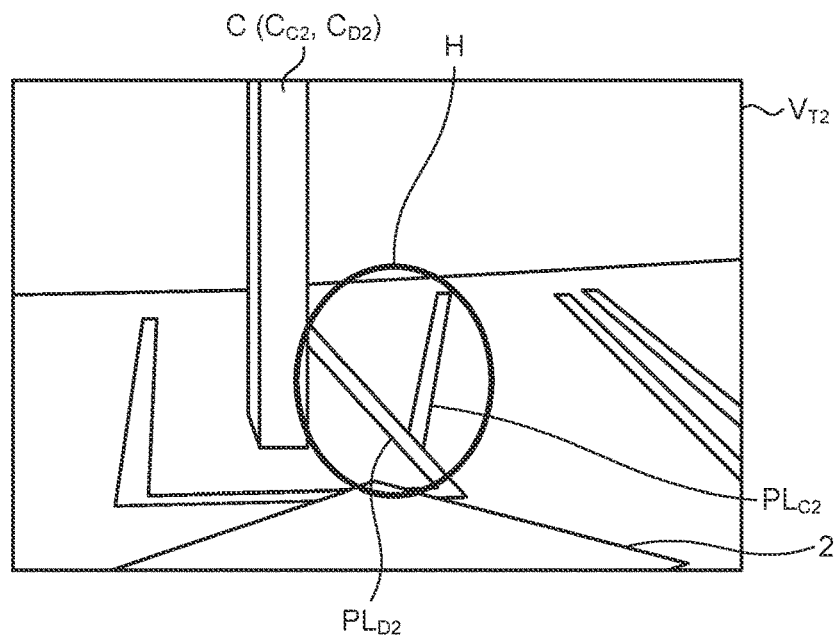
FIG. 15 is a view schematically illustrating an example of the combined image illustrated in FIG. 14.

FIG. 14 is a conceptual diagram in a case where the moving body 2 further travels toward the parking lot line PL from the state illustrated in FIGS. 12 and 13. In FIG. 14, a peripheral image obtained by performing perspective projection conversion on an image photographed by the photographing unit 12C and a peripheral image obtained by performing perspective projection conversion on an image photographed by the photographing unit 12D are superimposed on each other. FIG. 15 is a diagram schematically illustrating an example of the combined image $V_{T2}$ illustrated in FIG. 14. In a case where FIGS. 14 and 15 are compared with FIGS. 12 and 13, since the moving body 2 further advances toward the parking lot line PL, the position of the column C moves from the rear side to the front side of the moving body 2 on the right side surface of the moving body 2.

When the boundary region adaptation control is not executed, the boundary region BR remains at the position illustrated in FIG. 12, for example. Therefore, as a result of further traveling of the moving body 2 toward the parking lot line, the boundary region BR moves from the region overlapping the column C as illustrated in FIG. 12 to the region not overlapping the column C as illustrated in FIG. 14. The moved boundary region BR is projected in the region where the projection shape 41 rises, but the parking lot lines $PL_{C2}$ and $PL_{D2}$ as horizontal surface images included in the boundary region BR do not overlap in the region where the projection shape 41 rises. As a result, as illustrated in region H in FIG. 15, on the combined image $V_{T2}$, the parking lot line PL may be double-imaged as the parking lot lines $PL_{C2}$, $PL_{D2}$ in the boundary region BR.

Figure 16:
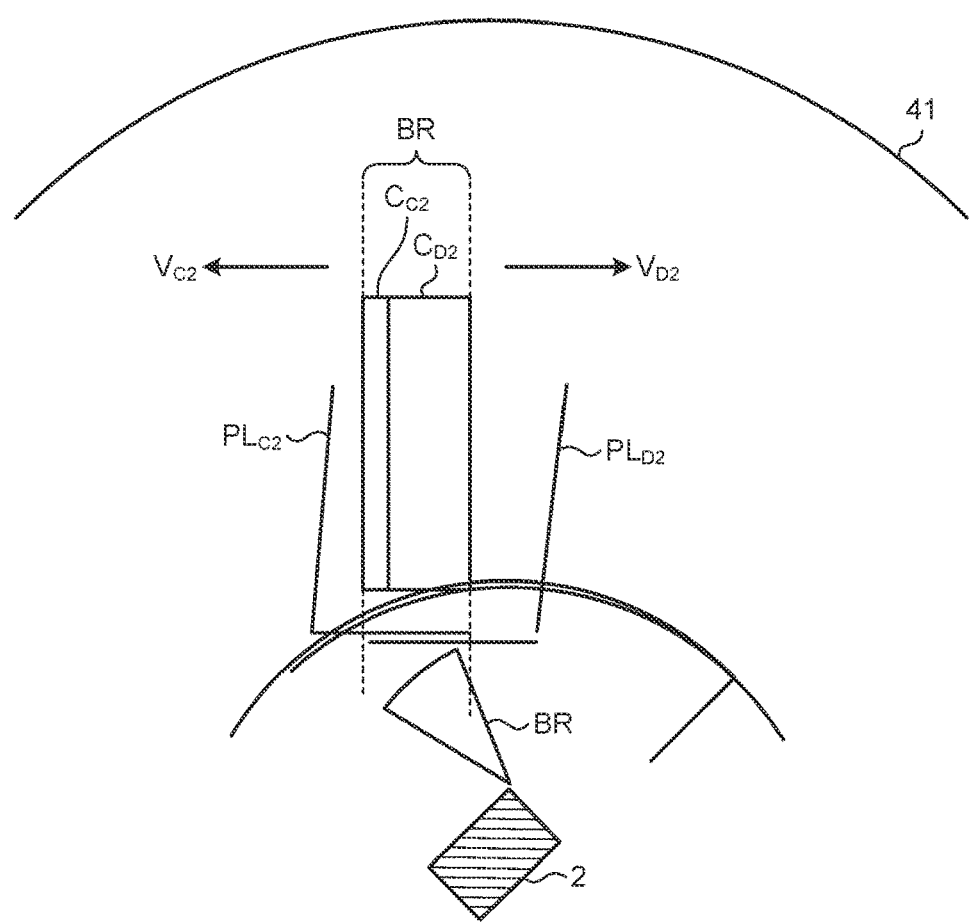
FIG. 16 is a conceptual diagram illustrating an example in which the projection processing illustrated in FIG. 14 is corrected by boundary region adaptation control.
Figure 17:
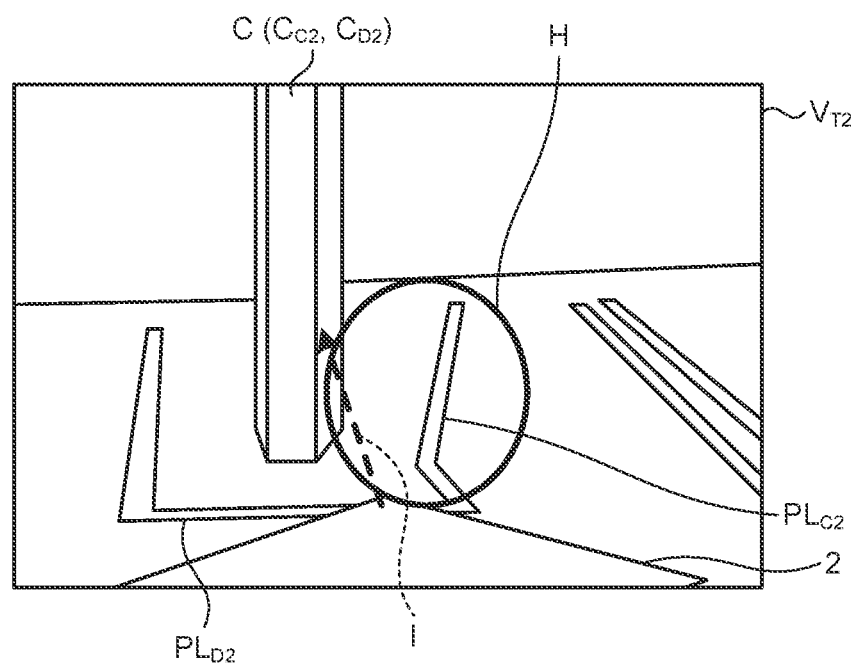
FIG. 17 is a view schematically illustrating an example of the combined image illustrated in FIG. 16.

FIG. 16 is a conceptual diagram illustrating an example in which the projection processing is adapted by the boundary region adaptation control with respect to the case illustrated in FIG. 14. In FIG. 16, a peripheral image obtained by performing perspective projection conversion on an image photographed by the photographing unit 12C and a peripheral image obtained by performing perspective projection conversion on an image photographed by the photographing unit 12D are superimposed on each other. FIG. 17 is a diagram schematically illustrating an example of the combined image $V_{T2}$ illustrated in FIG. 16.

As illustrated in FIG. 16, the image processing device 10 according to the present embodiment sets the boundary angle at the center position (the position indicated by the position I of the arrow in FIG. 17) of the column C, which is the nearest three-dimensional object, and sets the boundary region BR so as to be within the width of the column C by the boundary region adaptation control. Therefore, the parking lot line PL is projected by either the parking lot line $PL_{C2}$ corresponding to the right side peripheral image $V_{C2}$ or the parking lot line $PL_{D2}$ corresponding to the rear peripheral image $V_{D2}$ with respect to the projection shape 41. In the boundary region BR, the columns $C_{C2}$ and $C_{D2}$, which are the nearest three-dimensional objects, are projected so as to overlap each other on the horizontal surface and the side surface of the projection shape 41. As a result, as illustrated in a region H of FIG. 17, the double imaging of the parking lot line PL is eliminated on the combined image $V_{T2}$.

Next, an example of a flow of image processing including the boundary region adaptation control executed by the image processing device 10 according to the first embodiment will be described.

Figure 18:
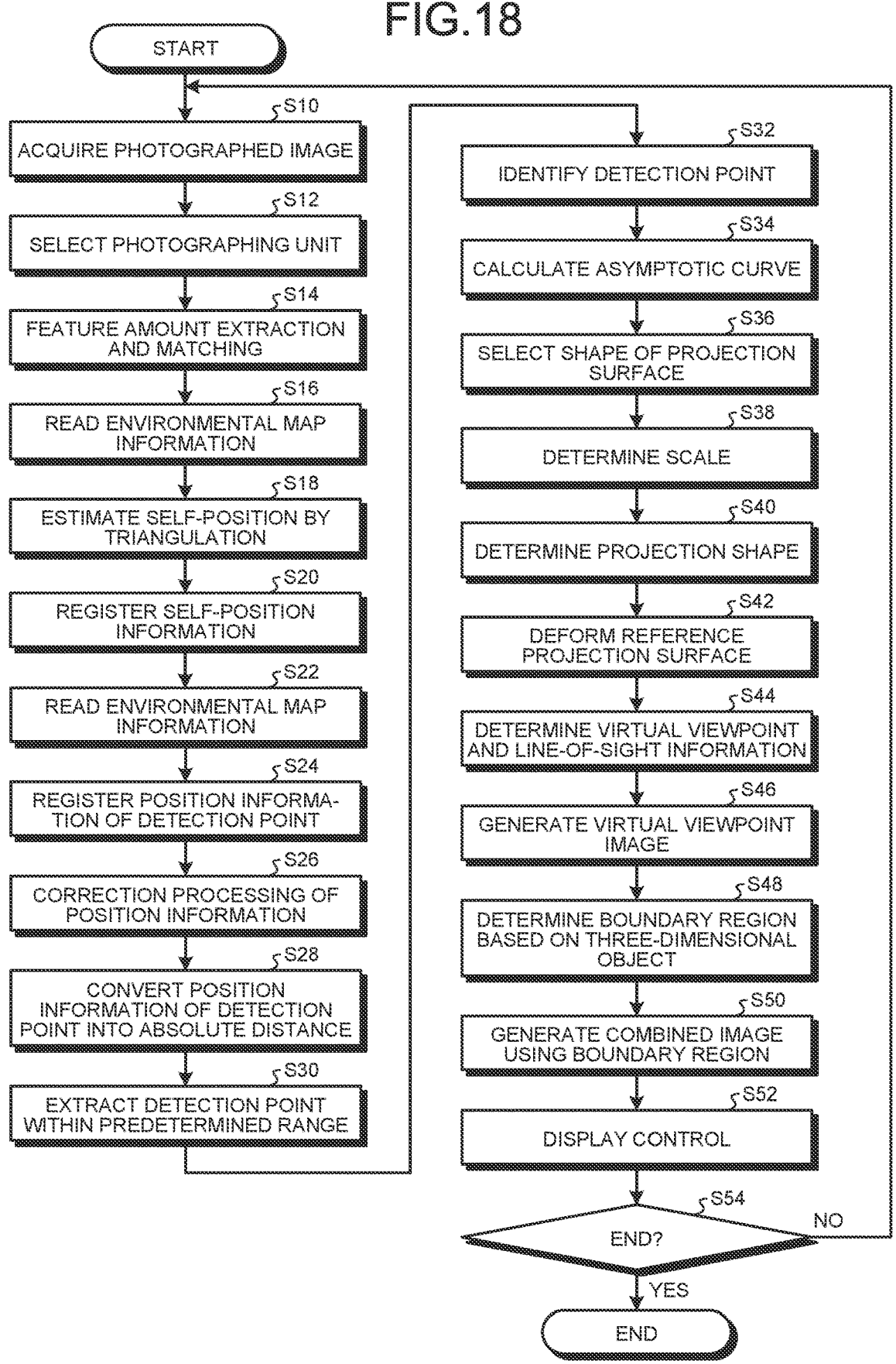
FIG. 18 is a flowchart illustrating an example of a flow of image processing executed by the image processing device according to the first embodiment.

FIG. 18 is a flowchart illustrating an example of a flow of image processing executed by the image processing device 10.

The acquisition unit 20 acquires the photographed image from the photographing unit 12 (step S10). In addition, the acquisition unit 20 executes acquisition of directly designated contents (for example, the gear of the moving body 2 becomes a back gear) and acquisition of a vehicle state (for example, a stop state or the like).

The selection unit 23 selects at least two of the photographing units 12A to 12D (step S12).

The matching unit 25 performs feature amount extraction and matching processing using a plurality of photographed images having different photographing timings selected in step S12 and photographed by the photographing unit 12 among the photographed images acquired in step S10 (step S14). In addition, the matching unit 25 registers, in the environmental map information 26A, information on corresponding points specified by the matching processing between a plurality of photographed images having different photographing timings.

The self-position estimation unit 27 reads the environmental map information 26A (map and self-position information) (step S16). The self-position estimation unit 27 calculates (estimates) the self-position information of the moving body 2 corresponding to each of different photographing timings by triangulation using the information of the points identified as corresponding to each other registered in the environmental map information 26A (step S18).

Then, the self-position estimation unit 27 adds (registers) the calculated self-position information to the environmental map information 26A (step S20).

The detection point registration unit 29 reads the environmental map information 26A (the map and the self-position information) (step S22), and obtains the movement amount (the translation amount and the rotation amount) of the moving body 2 using the self-position information of the moving body 2 corresponding to each of different photographing timings. The detection point registration unit 29 obtains, from the movement amount, the relative three-dimensional coordinates of the corresponding point identified by the matching processing in step S14 between the plurality of photographed images having different photographing timings, with respect to the self-position of the moving body 2, and executes three-dimensional restoration. The detection point registration unit 29 registers the three-dimensional coordinates as the coordinates of the detection point P in the environmental map information 26A (step S24). The coordinates of the detection point P registered in the environmental map information 26A may be converted into coordinates with a predetermined position as an origin.

The correction unit 28 takes in the environmental map information 26A (map and self-position information). The correction unit 28 corrects the position information of the detection point P registered in the environmental map information 26A by, for example, error minimization processing by further using the position information of the detection point P newly registered by the detection point registration unit 29 (step S26). As a result, the map and the self-position information in the environmental map information 26A are updated.

The absolute distance conversion unit 30A fetches speed data (subject vehicle speed) of the moving body 2 included in the CAN data received from the ECU 3 of the moving body 2. Using the speed data of the moving body 2, the absolute distance conversion unit 30A converts the position information of each of the plurality of detection points P included in the environmental map information 26A into distance information of an absolute distance from a current position that is the latest self-position S of the moving body 2 to each of the plurality of detection points P (step S28). The absolute distance conversion unit 30A outputs the calculated distance information of each of the plurality of detection points P to the extraction unit 30B. Furthermore, the absolute distance conversion unit 30A outputs the calculated current position of the moving body 2 to the virtual viewpoint and line-of-sight determination unit 34 as self-position information of the moving body 2.

The extraction unit 30B extracts the detection point P existing within a specific range among the plurality of detection points P for which the distance information has been received (step S30).

The nearest neighbor identifying unit 30C divides the periphery of the self-position S of the moving body 2 for each specific angular range, identifies the detection point P closest to the moving body 2 or a plurality of detection points P in order of proximity to the moving body 2 for each angular range, and extracts the distance to the nearest neighbor object (step S32). The nearest neighbor identifying unit 30C outputs distance information (distance to the nearest object) of the detection point P identified for each angular range to the reference projection surface shape selection unit 30D, the scale determination unit 30E, the asymptotic curve calculation unit 30F, and the boundary region determination unit 30H.

The asymptotic curve calculation unit 30F calculates an asymptotic curve (step S34), and outputs the asymptotic curve to the shape determination unit 30G and the virtual viewpoint and line-of-sight determination unit 34 as asymptotic curve information.

The reference projection surface shape selection unit 30D selects the shape of the reference projection surface 40 (step S36), and outputs shape information of the selected reference projection surface 40 to the shape determination unit 30G.

The scale determination unit 30E determines a scale of the reference projection surface 40 having the shape selected by the reference projection surface shape selection unit 30D (step S38), and outputs scale information of the determined scale to the shape determination unit 30G.

The shape determination unit 30G determines the projection shape as to how to deform the shape of the reference projection surface on the basis of the scale information and the asymptotic curve information (step S40). The shape determination unit 30G outputs projection shape information of the determined projection shape 41 to the deformation unit 32.

A projection conversion unit 35 deforms the reference projection surface on the basis of the projection shape information (step S42), and the projection conversion unit 35 determines virtual visual line viewpoint information including a virtual visual point and a virtual visual line for drawing the minimum value of the asymptotic line at the screen center (step S44).

Furthermore, the projection conversion unit 35 executes perspective projection using the deformed projection shape, the determined virtual viewpoint, and the virtual line of sight, and generates a virtual viewpoint image regarding peripheral images in the four directions (step S46).

The boundary region determination unit 30H determines the boundary region based on the distance to the nearest object identified for each angular range. That is, the boundary region determination unit 30H determines a boundary region as an overlapping region of the spatially adjacent peripheral images on the basis of the position of the nearest object of the moving body 2 (step S48). The boundary region determination unit 30H outputs the determined boundary region to the image combining unit 38.

The image combining unit 38 combines the spatially adjacent perspective projection images using the boundary region to generate a combined image (step S50). That is, the image combining unit 38 generates a combined image by joining the perspective projection images in the four directions according to the boundary region set to the angle in the nearest object direction. In the boundary region, spatially adjacent perspective projection images are blended at a predetermined ratio.

The display unit 16 displays the combined image (step S52).

The image processing device 10 determines whether or not to end the image processing (step S54). For example, the image processing device 10 determines whether or not a signal indicating the position movement stop of the moving body 2 has been received from the ECU 3, thereby making the determination in step S54. Furthermore, for example, the image processing device 10 may perform the determination of step S54 by determining whether or not an instruction to end the image processing has been received by an operation instruction or the like by the user.

When a negative determination is made in step S54 (step S54: No), the processing from step S10 to step S54 is repeatedly executed. Therefore, the boundary region for connecting the spatially adjacent peripheral images is set following the angle in the direction of the nearest object.

On the other hand, when an affirmative determination is made in step S54 (step S54: Yes), this routine is ended.

When the process returns from step S54 to step S10 after the correction processing of step S26 is executed, the subsequent correction processing of step S26 may be omitted. In addition, in a case where the process returns from step S54 to step S10 without executing the correction processing of step S26, there may be a case where the subsequent correction processing of step S26 is executed.

As described above, the image processing device according to the embodiment includes the boundary region determination unit 30H as a determination unit and the image generation unit 37 as a generation unit. The boundary region determination unit 30H determines a boundary region in an overlapping region of spatially adjacent peripheral images among the plurality of peripheral images of the moving body 2 using the position information including the plurality of detection points P around the moving body 2 and the self-position information of the moving body 2. The image generation unit 37 generates a combined image using spatially adjacent peripheral images using the boundary region.

Therefore, the boundary region for connecting the spatially adjacent peripheral images among the plurality of peripheral images of the moving body 2 can be appropriately set according to the position information including the plurality of detection points P around the moving body 2 and the self-position information of the moving body 2.

In addition, the boundary region determination unit 30H determines the boundary region on the basis of the position information of the detection point P corresponding to the three-dimensional object closest to the moving body 2. Therefore, in the boundary region, the three-dimensional object closest to the moving body 2 is projected so as to overlap on the projection surface using the plurality of spatially adjacent peripheral images. In addition, in a region other than the boundary region, the projection processing using any of the spatially adjacent peripheral images is executed. As a result, it is possible to suppress the occurrence of problems such as double imaging of the parking lot line on the combined image.

In addition, the boundary region determination unit 30H determines the boundary region based on the width of the three-dimensional object closest to the moving body 2. Therefore, the boundary region can be set so as to fall within the width of the three-dimensional object located closest to the moving body 2. As a result, the boundary region does not protrude from the nearest three-dimensional object from the moving body 2, and the occurrence of double imaging or the like of the parking lot line in the horizontal region or the like can be suppressed.

The boundary region determination unit 30H determines a plurality of boundary regions to follow the three-dimensional object using the position information and the self-position information sequentially generated. The image generation unit 37 sequentially generates a combined image using spatially adjacent peripheral images using a plurality of boundary regions following the three-dimensional object. Therefore, the boundary region for connecting the spatially adjacent peripheral images is set following the angle in the direction of the nearest object. As a result, the user can use the highly accurate combined image in which the occurrence of double imaging or the like of the parking lot line is suppressed in the horizontal region or the like.

Furthermore, the image processing device 10 according to the present embodiment further includes the deformation unit 32 that deforms the reference projection surface using the position information and the self-position information. The image generation unit 37 generates the combined image using the deformed reference projection surface and the spatially adjacent peripheral images. Therefore, the boundary region for connecting the spatially adjacent peripheral images is set following the reference projection surface deformed according to the position of the nearest object. As a result, the user can use the highly accurate combined image in which the occurrence of double imaging or the like of the peripheral three-dimensional object of the moving body 2 is suppressed.

Figure 19:
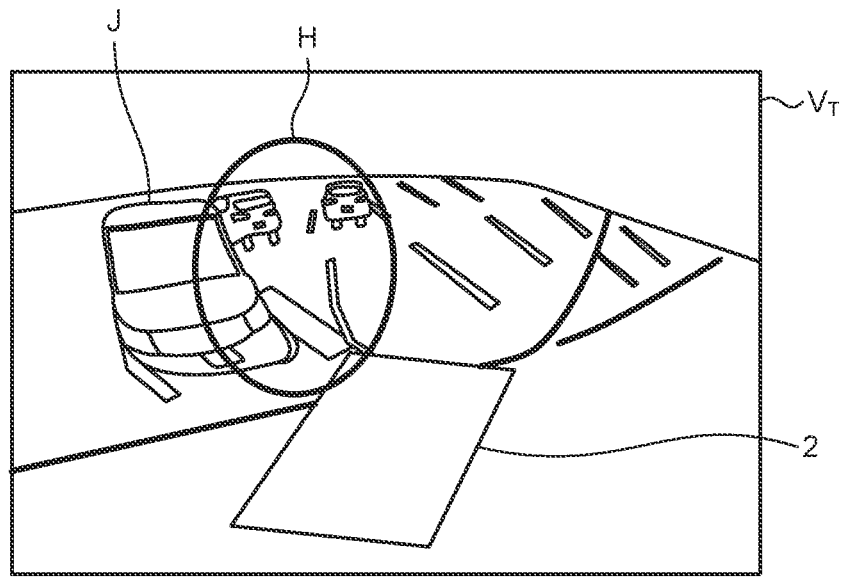
FIG. 19 is a diagram for describing a comparative example in which the boundary region adaptation control is not executed.
Figure 20:
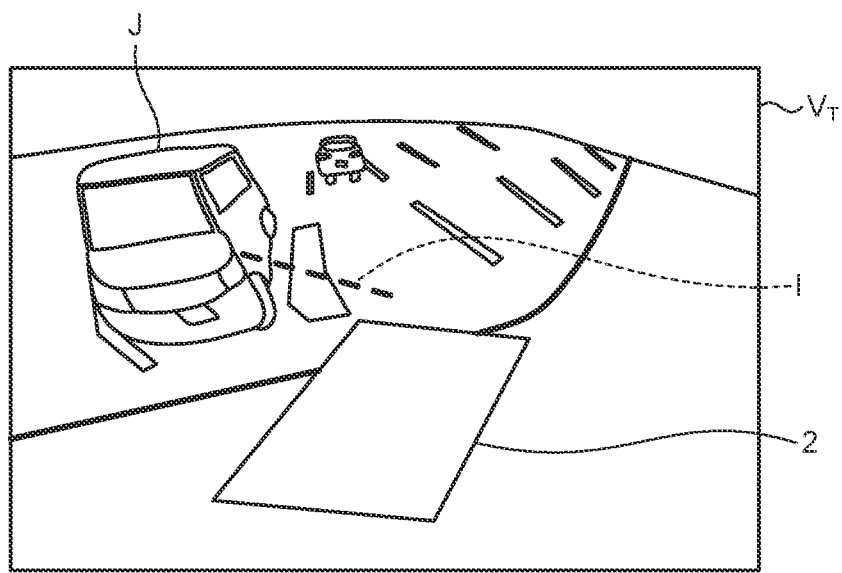
FIG. 20 is a diagram illustrating an example of a combined image obtained by image processing including the boundary region adaptation control.
Figure 21:
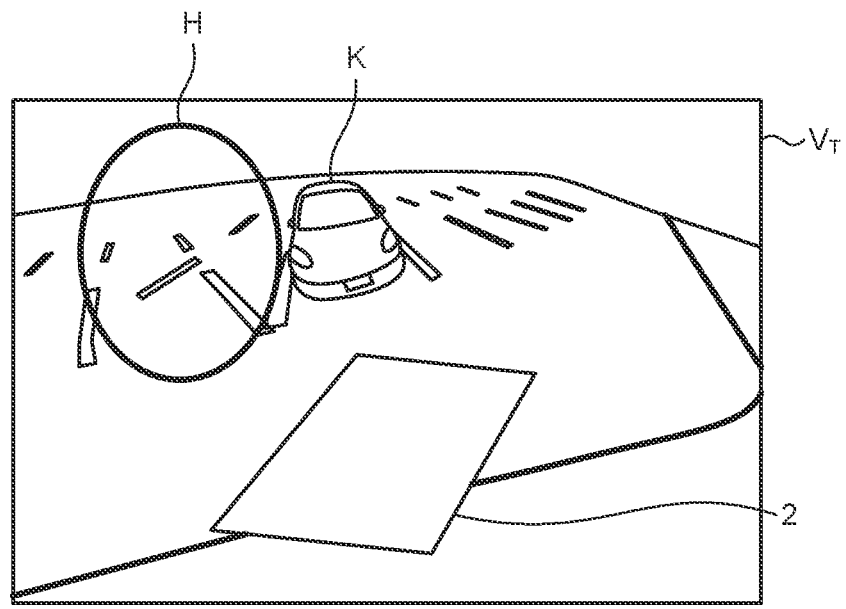
FIG. 21 is a diagram for describing a comparative example in which the boundary region adaptation control is not executed.
Figure 22:
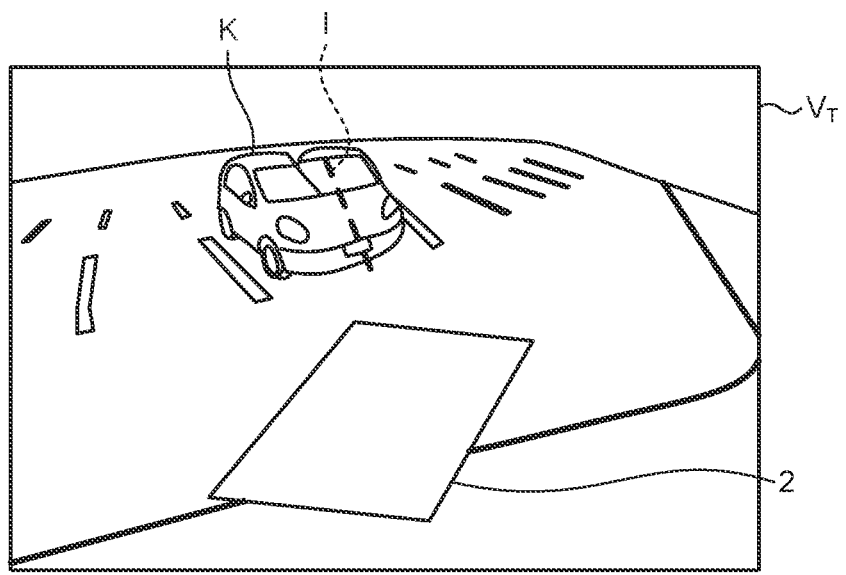
FIG. 22 is a diagram illustrating an example of a combined image obtained by image processing including the boundary region adaptation control.
Figure 23:
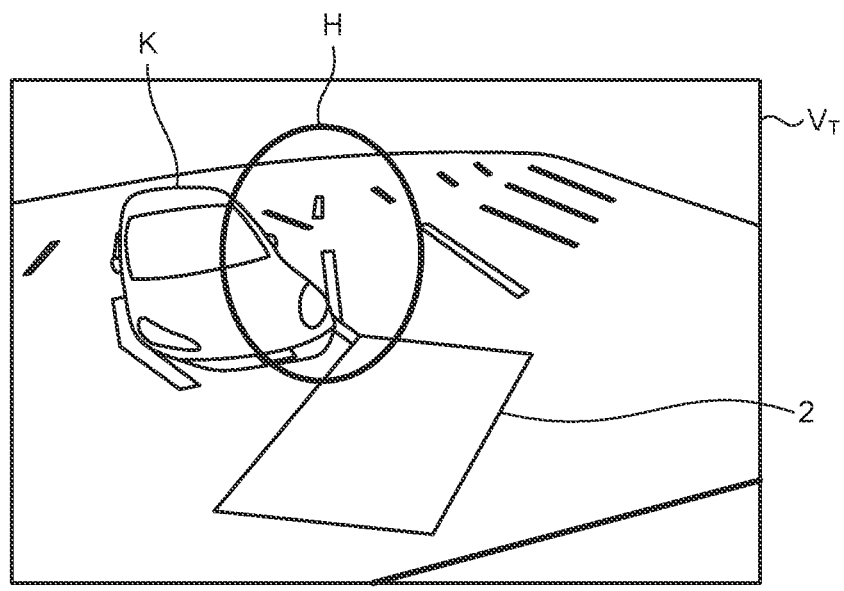
FIG. 23 is a diagram for describing a comparative example in which the boundary region adaptation control is not executed.
Figure 24:
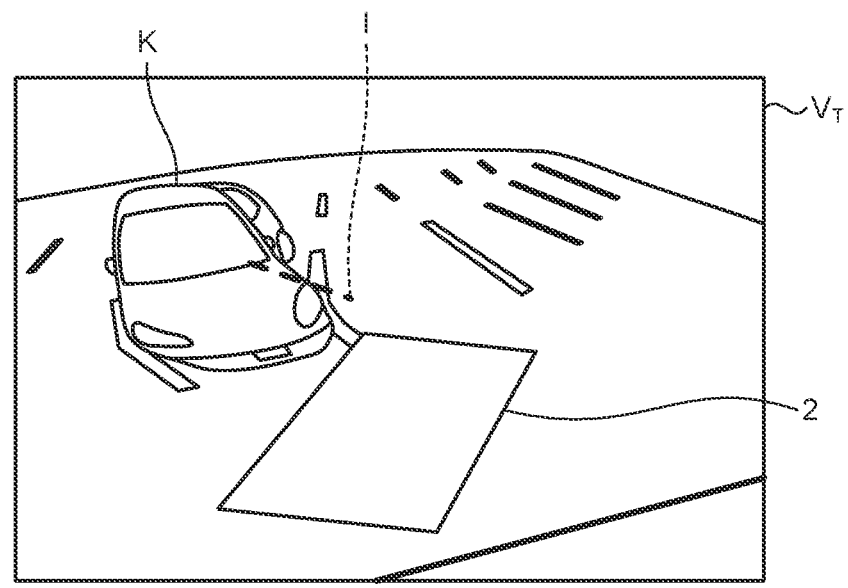
FIG. 24 is a diagram illustrating an example of a combined image obtained by image processing including the boundary region adaptation control.

The effect of the image processing device 10 according to the present embodiment will be described in more detail with reference to FIGS. 19 to 24. FIGS. 19, 21, and 23 are diagrams for describing a comparative example in which the boundary region adaptation control is not executed. FIGS. 20, 22, and 24 are diagrams illustrating an example of a combined image obtained by image processing including the boundary region adaptation control. Note that FIGS. 19 to 24 are examples of a case where the moving body 2 is parked behind.

In the comparative example illustrated in FIG. 19, the boundary angle is set to a position (about 45 degrees) deviated from the closest three-dimensional object J of the moving body 2. Therefore, in the region H illustrated in FIG. 19, a phenomenon in which the parking lot line is double-imaged occurs.

FIG. 20 illustrates an example showing the combined image in which the boundary region adaptation control according to the present embodiment is executed with respect to the comparative example illustrated in FIG. 19. By the boundary region adaptation control, the boundary angle is set to the position (about 75 degrees) of I overlapping the three-dimensional object J closest to the moving body 2, and the boundary width is set to be within the width of the three-dimensional object J closest to the moving body 2. Therefore, in FIG. 20, the double imaging of the parking lot line is eliminated.

FIGS. 21 and 22 illustrate examples of a combined image in a case where the moving body 2 moves from the position in the cases of FIGS. 19 and 20 and performs rear parking at another place. FIG. 21 illustrates a comparative example in which the boundary angle set in FIG. 20 is maintained even when the moving body 2 moves. In this case, the boundary angle is set to a position (about 75 degrees) deviated from the closest three-dimensional object K of the moving body 2. Therefore, in the region H illustrated in FIG. 21, a phenomenon in which the parking lot line is double-imaged occurs. Note that FIGS. 21 and 22 may indicate that the moving body 2 has moved forward from the position illustrated in FIGS. 19 and 20 by performing switching in rear parking or the like.

FIG. 22 illustrates an example showing the combined image in which the boundary region adaptation control according to the present embodiment is executed with respect to the comparative example illustrated in FIG. 21. By the boundary region adaptation control, the boundary angle is set to the position of I overlapping the three-dimensional object K in the nearest vicinity of the moving body 2 (about 25 degrees), and the boundary region is set to be within the width of the three-dimensional object K in the nearest vicinity of the moving body 2. Therefore, in FIG. 22, the double imaging of the parking lot line is eliminated.

In FIGS. 23 and 24, the moving body 2 moves rearward from the position of the moving body 2 in FIGS. 21 and 22. FIG. 23 illustrates a comparative example in which the boundary angle set in FIG. 22 is maintained even when the moving body 2 moves. In this case, the boundary angle is set to a position (about 25 degrees) deviated from the closest three-dimensional object K of the moving body 2. Therefore, in the region H illustrated in FIG. 23, a phenomenon in which the parking lot line is double-imaged occurs.

FIG. 24 illustrates an example showing the combined image in which the boundary region adaptation control according to the present embodiment is executed with respect to the comparative example illustrated in FIG. 23. By the boundary region adaptation control, the boundary angle is set to a position I (about 60 degrees) overlapping the three-dimensional object K in the nearest vicinity of the moving body 2, and the boundary region is set to be within the width of the three-dimensional object K in the nearest vicinity of the moving body 2. In this case, the boundary angle is continuously controlled as the moving body 2 moves backward. Therefore, in FIG. 24, the double imaging of the parking lot line is eliminated. In this way, by executing the boundary region adaptation control following the movement of the moving body 2, it is possible to continuously suppress the occurrence of double imaging or the like of the peripheral three-dimensional object of the moving body 2.

Second Embodiment

In the first embodiment, an example of a mode of acquiring the position information of the detection point P from the photographed image by the photographing unit 12, that is, a mode using visual SLAM has been described. On the other hand, in the second embodiment, an example of a mode in which the position information of the detection point P is detected by the detection unit 14 will be described. That is, the image processing device 10 according to the second embodiment is an example using three-dimensional LiDAR SLAM or the like.

Figure 25:
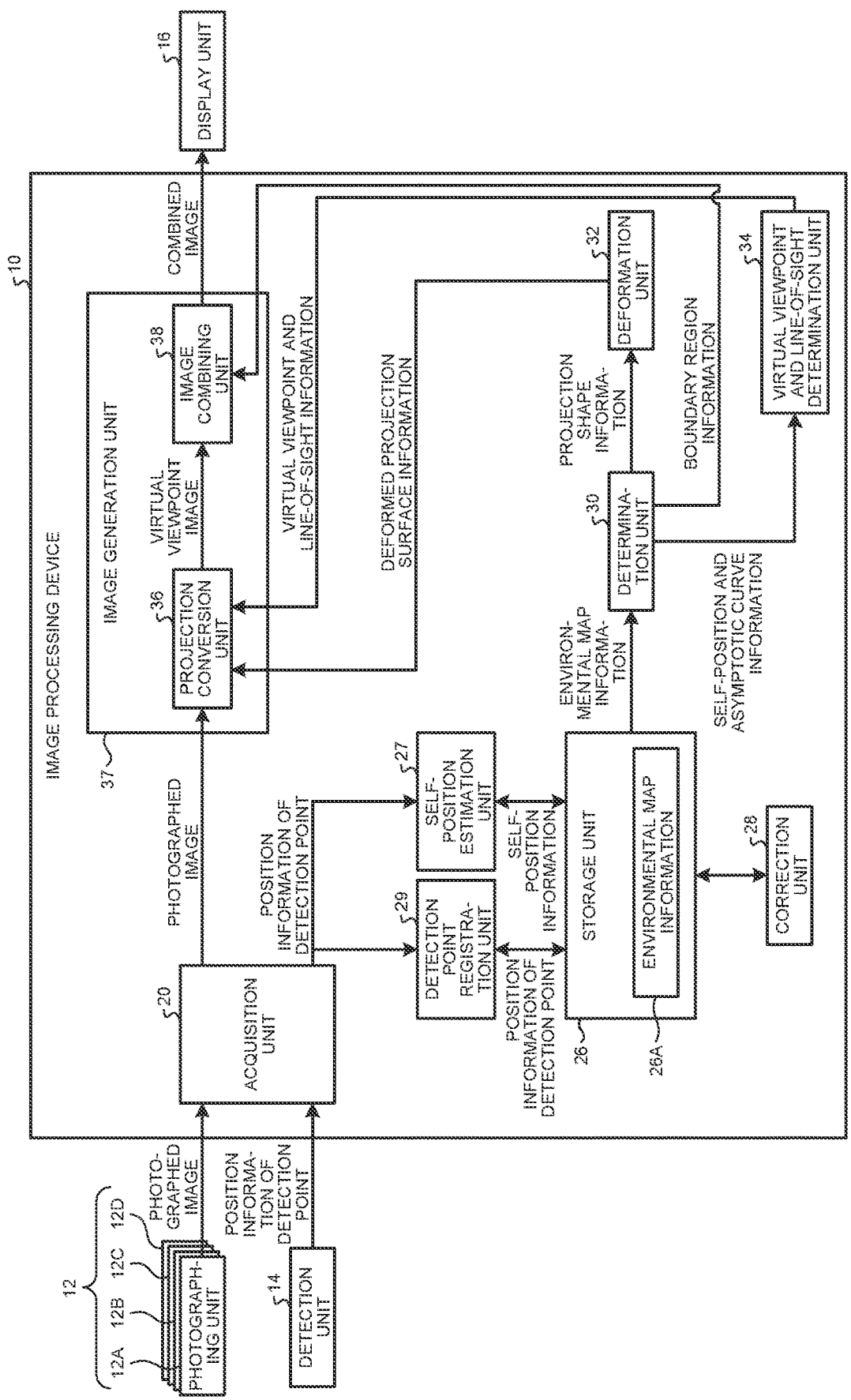
FIG. 25 is a diagram illustrating an example of a functional configuration of an image processing device according to a second embodiment.

FIG. 25 is a diagram illustrating an example of a functional configuration of the image processing device 10 according to the second embodiment. Similarly to the image processing device 10 of the first embodiment, the image processing device 10 is connected to the photographing unit 12, the detection unit 14, and the display unit 16 so as to be able to exchange data or signals.

The image processing device 10 includes an acquisition unit 20, a self-position estimation unit 27, a detection point registration unit 29, a storage unit 26, a correction unit 28, a determination unit 30, a deformation unit 32, a virtual viewpoint and line-of-sight determination unit 34, a projection conversion unit 36, and an image combining unit 38.

Some or all of the plurality of units may be realized, for example, by causing a processing device such as the CPU 10A illustrated in FIG. 2 to execute a program, that is, by software. In addition, some or all of the plurality of units may be realized by hardware such as an IC, or may be realized using software and hardware in combination.

In FIG. 25, a storage unit 26, a correction unit 28, a determination unit 30, a deformation unit 32, a virtual viewpoint and line-of-sight determination unit 34, a projection conversion unit 36, and an image combining unit 38 are similar to those of the first embodiment. The storage unit 26 stores the environmental map information 26A. The environmental map information 26A is similar to that of the first embodiment.

The acquisition unit 20 acquires the photographed image from the photographing unit 12. In addition, the acquisition unit 20 acquires the position information of the detection point from the detection unit 14. The acquisition unit 20 acquires photographed images from the respective photographing units 12 (photographing units 12A to 12D). The detection unit 14 detects position information of each of the plurality of detection points. Therefore, the acquisition unit 20 acquires the position information of each of the plurality of detection points and the photographed image by each of the plurality of photographing units 12.

The acquisition unit 20 outputs the acquired position information to the detection point registration unit 29 and the self-position estimation unit 27 every time the position information of each of the plurality of detection points is acquired. In addition, every time a photographed image is acquired, the acquisition unit 20 outputs the acquired photographed image to the projection conversion unit 36.

Each time the position information of each of the plurality of detection points is acquired, the detection point registration unit 29 registers each piece of the acquired position information in the environmental map information 26A. The environmental map information 26A is stored in the storage unit 26.

Every time the position information of the detection point P is acquired from the detection unit 14 via the acquisition unit 20, the detection point registration unit 29 identifies the same detection point P registered in the environmental map information 26A by scan matching. The same detection point P means that the acquisition timing of the position information by the detection unit 14 is different, but the detection points P are the same in the real space. The detection point registration unit 29 additionally registers, in the environmental map information 26A, the position information of the detection point P not registered in the environmental map information 26A among the position information of the detection point P acquired from the detection unit 14. At this time, the detection point registration unit 29 coordinate-transforms the acquired position information of the detection point P into coordinates having the predetermined position as an origin, and then registers the coordinate information in the environmental map information 26A.

As a result of the scan matching performed by the detection point registration unit 29, there may be a case where the detection points P registered in the environmental map information 26A do not coincide with the newly acquired detection points P by a predetermined ratio or more. In this case, the detection point registration unit 29 may discard the newly acquired position information of the detection point P and omit the registration to the environmental map information 26A. The predetermined ratio may be determined in advance. With this processing, the reliability of the environmental map information 26A can be enhanced.

Note that the detection point registration unit 29 preferably registers various parameters used for calculating the position information of the detection point P in the environmental map information 26A together with the position information.

The self-position estimation unit 27 estimates self-position information indicating the self-position S of the moving body 2 on the basis of the position information of each of the plurality of detection points P registered in the environmental map information 26A. Then, the self-position estimation unit 27 registers the self-position information of the estimated self-position S in the environmental map information 26A.

Using the position information of each of the detection points P registered in the environmental map information 26A and the position information of each of the latest detection points P acquired from the detection unit 14 via the acquisition unit 20, the self-position estimation unit 27 identifies the corresponding detection points P included in these position information. The corresponding detection point P means that the acquisition timing of the position information by the detection unit 14 is different, but the detection points P are the same in the real space. The self-position estimation unit 27 calculates the self-position information of the self-position S of the moving body 2 by triangulation using the position information of each of the identified corresponding detection points P. Then, the self-position estimation unit 27 registers the calculated self-position information in the environmental map information 26A. Note that the self-position estimation unit 27 may estimate the self-position information using odometry.

As described above, in the present embodiment, the image processing device 10 simultaneously executes registration of the position information of the detection point P in the environmental map information 26A and estimation of the self-position information of the moving body 2 by SLAM.

Next, an example of a flow of image processing including the boundary region adaptation control executed by the image processing device 10 according to the second embodiment will be described.

Figure 26:
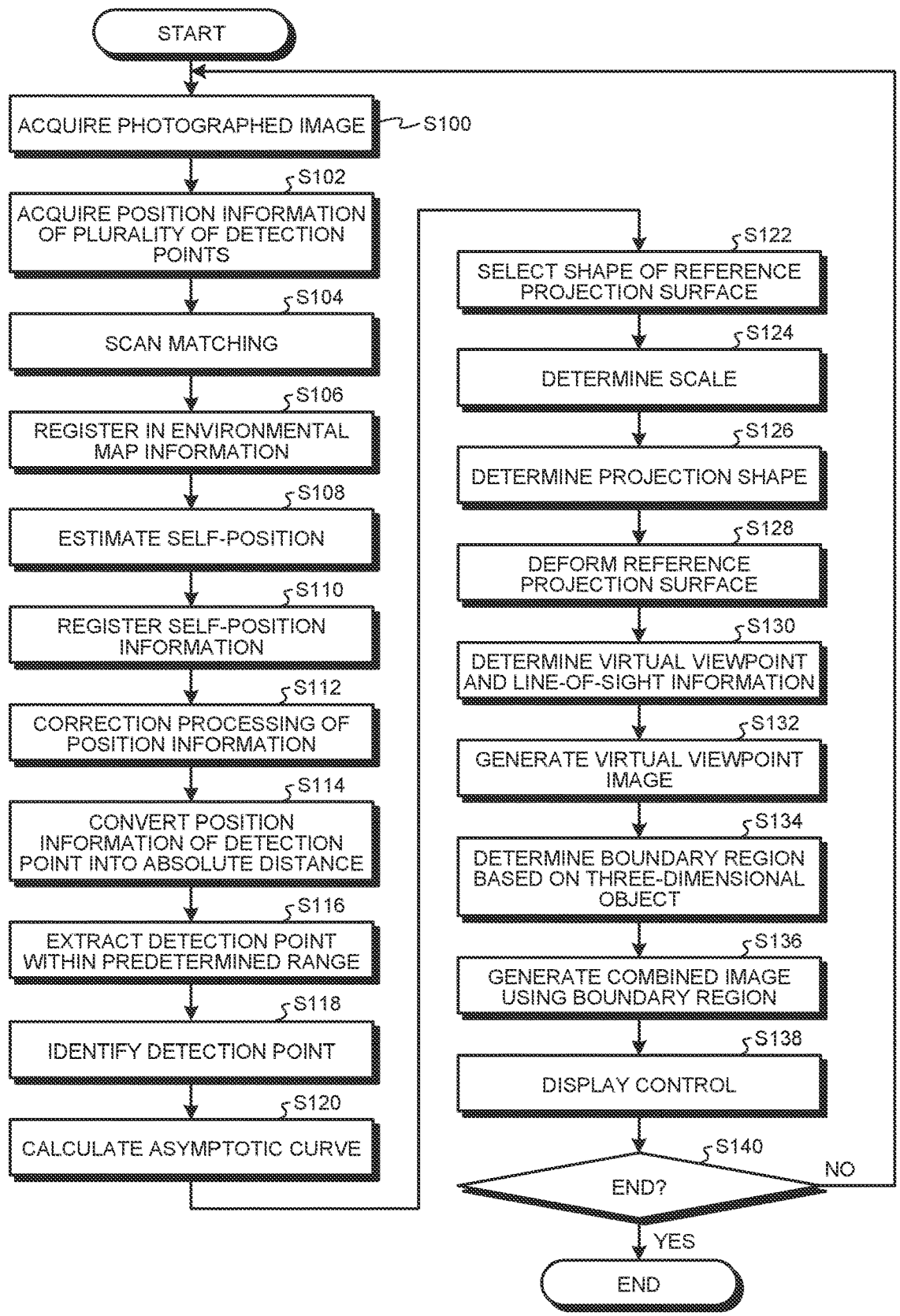
FIG. 26 is a flowchart illustrating an example of a flow of image processing executed by the image processing device according to the second embodiment.

FIG. 26 is a flowchart illustrating an example of a flow of image processing executed by the image processing device 10.

The acquisition unit 20 acquires the photographed image from the photographing unit 12 (step S100). In addition, the acquisition unit 20 acquires the position information of each of the plurality of detection points P from the detection unit 14 (step S102).

The detection point registration unit 29 identifies the same detection point P registered in the environmental map information 26A among the respective detection points P of the position information acquired in step S102 by scan matching (step S104). Then, the detection point registration unit 29 registers, in the environmental map information 26A, the position information of the detection point P not registered in the environmental map information 26A among the position information of the detection point P acquired in step S102 (step S106).

The self-position estimation unit 27 estimates self-position information indicating the self-position S of the moving body 2 on the basis of the position information of each of the plurality of detection points P registered in the environmental map information 26A and the position information acquired in step S102 (step S108). Then, the self-position estimation unit 27 registers the estimated self-position information in the environmental map information 26A (step S110).

The correction unit 28 corrects the position information of the detection point P registered in the environmental map information 26A using the position information of the detection point P acquired in step S102 (step S112). As described above, the correction processing in step S112 may not be executed.

The absolute distance conversion unit 30A of the determination unit 30 converts the position information of each of the plurality of detection points P included in the environmental map information 26A into distance information of an absolute distance from the current position of the moving body 2 to each of the plurality of detection points P (step S114).

The extraction unit 30B extracts a detection point P present within a specific range among the detection points P for which the absolute distance information has been calculated by the absolute distance conversion unit 30A (step S116).

The nearest neighbor identifying unit 30C identifies a plurality of detection points P in order of proximity to the moving body 2 for each angular range around the moving body 2 using the distance information of each of the detection points P extracted in step S116 (step S118).

The asymptotic curve calculation unit 30F calculates the asymptotic curve Q using each piece of the distance information of the plurality of detection points P identified in step S118 for each angular range (step S120).

The reference projection surface shape selection unit 30D selects the shape of the reference projection surface 40 (step S122). As described above, a mode in which the reference projection surface shape selection unit 30D selects the bowl-shaped reference projection surface 40 will be described as an example.

The scale determination unit 30E determines the scale of reference projection surface 40 having the shape selected in step S122 (step S124).

The shape determination unit 30G enlarges or reduces reference projection surface 40 having the shape selected in step S122 to the scale determined in step S124. Then, the shape determination unit 30G deforms the enlarged or reduced reference projection surface 40 so as to have a shape along the asymptotic curve Q calculated in step S120. The shape determination unit 30G determines the deformed shape as the projection shape 41 (step S126).

The deformation unit 32 deforms the reference projection surface 40 into the projection shape 41 determined by the determination unit 30 (step S128). Through this deformation process, the deformation unit 32 generates a deformed projection surface 42 that is the deformed reference projection surface 40.

The virtual viewpoint and line-of-sight determination unit 34 determines virtual viewpoint and line-of-sight information (step S130). For example, the virtual viewpoint and line-of-sight determination unit 34 determines the self-position S of the moving body 2 as the virtual viewpoint O, and determines the direction from the virtual viewpoint O toward the position of the vertex W of the asymptotic curve Q as the line-of-sight direction L. Specifically, the virtual viewpoint and line-of-sight determination unit 34 may determine, as the line-of-sight direction L, a direction toward the vertex W of the asymptotic curve Q of one specific angular range among the asymptotic curves Q calculated for each angular range in step S120.

The projection conversion unit 36 projects the photographed image acquired in step S100 onto the deformed projection surface 42 generated in step S128. Then, the projection conversion unit 36 converts the projection image into a virtual viewpoint image that is an image obtained by visually recognizing the photographed image projected on the deformed projection surface 42 in the line-of-sight direction L from the virtual viewpoint O determined in step S130 (step S132).

The boundary region determination unit 30H determines the boundary region based on the distance to the nearest object identified for each angular range. That is, the boundary region determination unit 30H determines a boundary region as an overlapping region of the spatially adjacent peripheral images on the basis of the position of the nearest object of the moving body 2 (step S134). The boundary region determination unit 30H outputs the determined boundary region to the image combining unit 38.

The image combining unit 38 generates a combined image by joining the spatially adjacent perspective projection images using the boundary region (step S136). That is, the image combining unit 38 generates a combined image by joining the perspective projection images in the four directions according to the boundary region set to the angle in the nearest object direction. In the boundary region, spatially adjacent perspective projection images are blended at a predetermined ratio.

The display unit 16 executes display control to display the generated combined image 54 (step S138).

Next, the image processing device 10 determines whether or not to end the image processing (step S140). For example, the image processing device 10 determines whether or not a signal indicating the position movement stop of the moving body 2 has been received from the ECU 3, thereby making the determination in step S140. Furthermore, for example, the image processing device 10 may perform the determination of step S140 by determining whether or not an instruction to end the image processing has been received by an operation instruction or the like by the user.

When a negative determination is made in step S140 (step S140: No), the processing from step S100 to step S140 is repeatedly executed. Therefore, the boundary region for connecting the spatially adjacent peripheral images is set following the angle in the direction of the nearest object. On the other hand, when an affirmative determination is made in step S140 (step S140: Yes), this routine is ended.

When the process returns from step S140 to step S100 after the correction processing of step S112 is executed, the subsequent correction processing of step S112 may be omitted. In addition, in a case where the process returns from step S140 to step S100 without executing the correction processing of step S112, there may be a case where the subsequent correction processing of step S112 is executed.

As described above, the image processing device 10 according to the second embodiment generates the position information including the plurality of detection points P around the moving body 2 and the self-position information of the moving body 2 by the SLAM using the photographed image photographed by the photographing unit 12 and the position information detected by the detection unit 14. The boundary region determination unit 30H determines a boundary region in an overlapping region of spatially adjacent peripheral images among the plurality of peripheral images of the moving body 2 using the position information and the self-position information. The image generation unit 37 generates a combined image using the boundary region and the spatially adjacent peripheral images. Therefore, according to the image processing device 10 according to the second embodiment, it is possible to realize the same functions and effects as those of the image processing device 10 according to the first embodiment.

Modified Example

In each of the above embodiments, the image processing device 10 using SLAM has been described. On the other hand, it is also possible to create environmental map information using an immediate value by a sensor array constructed by a plurality of distance sensors without using SLAM, and execute image processing including the boundary region adaptation control using the environmental map information.

Although the embodiments and the modifications have been described above, the image processing device, the image processing method, and the computer-readable medium disclosed in the present application are not limited to the above-described embodiments and the like as they are, and the components can be modified and embodied in each implementation stage and the like without departing from the gist thereof. In addition, various inventions can be formed by appropriately combining a plurality of constituent elements disclosed in the above embodiments and the like. For example, some components may be deleted from all the components shown in the embodiments.

Note that the image processing device 10 of the first embodiment and the second embodiment can be applied to various devices. For example, the image processing device 10 of the first embodiment and the second embodiment can be applied to a monitoring camera system that processes a video obtained from a monitoring camera, an in-vehicle system that processes an image of a surrounding environment outside the vehicle, or the like.

According to an aspect of the image processing device disclosed in the present application, it is possible to solve a problem in a case where a combined image obtained by superimposing a plurality of images is projected and displayed on a projection surface.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing device comprising
a hardware processor configured to function as:
a determination unit that sets a boundary angle between images to be combined in an image combining process to overlap a three-dimensional object closest to a moving body and determines, using the boundary angle, a boundary region in a region where spatially adjacent peripheral images of a plurality of peripheral images of the moving body overlap with each other, using position information including a plurality of detection points around the moving body and self-position information of the moving body; and an image generation unit that generates a combined image, using the spatially adjacent peripheral images, using the boundary region.

2. The image processing device according to claim 1, wherein
the determination unit determines the boundary region, based on a width of the three-dimensional object.

3. The image processing device according to claim 1, wherein
the determination unit determines the boundary region including a plurality of boundary regions following the three-dimensional object, using the position information and the self-position information sequentially generated, and
the image generation unit sequentially generates the combined image using the spatially adjacent peripheral images, using the plurality of boundary regions following the three-dimensional object.

4. The image processing device according to claim 1, wherein
the hardware processor is configured to further function as a deformation unit that deforms a reference projection surface, using the position information and the self-position information, and
the image generation unit generates the combined image, using the deformed reference projection surface and the spatially adjacent peripheral images.

5. The image processing device according to claim 1, wherein
the plurality of detection points are detected using the plurality of peripheral images.

6. The image processing device according to claim 1, wherein
the plurality of detection points are detected by a detection unit mounted on the moving body.

7. The image processing device according to claim 1, wherein the boundary angle is set within a width of the three-dimensional object.

8. An image processing method executed by a computer, comprising:
setting a boundary angle between images to be combined in an image combining process to overlap a three-dimensional object closest to a moving body;
determining, using the boundary angle, a boundary region of spatially adjacent peripheral images of a plurality of peripheral images of the moving body, using position information including a plurality of detection points around the moving body and self-position information of the moving body; and
generating a combined image, using the spatially adjacent peripheral images, using the boundary region.

9. The image processing method according to claim 8, wherein the boundary angle is set within a width of the three-dimensional object.

10. A computer-readable recording medium having stored therein an image processing program for causing a computer to execute:
setting a boundary angle between images to be combined in an image combining process to overlap a three-dimensional object closest to a moving body;
determining, using the boundary angle, a boundary region in a region where spatially adjacent peripheral images of a plurality of peripheral images of the moving body overlap with each other, using position information including a plurality of detection points around the moving body and self-position information of the moving body; and
generating a combined image, using the spatially adjacent peripheral images, using the boundary region.

11. The computer-readable recording medium according to claim 10, wherein the boundary angle is set within a width of the three-dimensional object.

* * * * *